United States Patent
Higashi et al.

(10) Patent No.: US 7,450,179 B2
(45) Date of Patent: Nov. 11, 2008

(54) DATA BROADCASTING SYSTEM, AND DATA BROADCASTING CONTENTS TRANSMITTING SYSTEM, RECEIVER, AND FORMAT CONVERTING METHOD USED IN SAME

(75) Inventors: Masahiro Higashi, Tokyo (JP); Satoshi Hasegawa, Tokyo (JP); Kazuhito Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 11/087,507

(22) Filed: Mar. 24, 2005

(65) Prior Publication Data

US 2005/0212964 A1    Sep. 29, 2005

(30) Foreign Application Priority Data

Mar. 25, 2004   (JP)   .............................. 2004-089004

(51) Int. Cl.
H04N 5/46 (2006.01)

(52) U.S. Cl. ........................ 348/555; 348/723; 348/725; 348/556; 348/441; 348/423.1; 348/581; 348/473

(58) Field of Classification Search ................. 348/555, 348/556, 441, 723, 473, 423.1, 426.1, 432.1, 348/489, 460, 461, 465, 725, 458, 459, 581; 370/535, 916
See application file for complete search history.

(56) References Cited

U.S. PATENT DOCUMENTS

| | | | | |
|---|---|---|---|---|
| 5,270,813 A * | 12/1993 | Puri et al. | ............... | 375/240.15 |
| 5,742,343 A * | 4/1998 | Haskell et al. | ......... | 375/240.15 |
| 6,058,240 A * | 5/2000 | McLaren | ...................... | 386/68 |
| 6,108,044 A * | 8/2000 | Shin | ........................... | 348/555 |
| 6,130,708 A * | 10/2000 | Kitagawa et al. | ............ | 348/184 |
| 6,226,038 B1 * | 5/2001 | Frink et al. | .................. | 348/443 |
| 6,285,408 B1 * | 9/2001 | Choi et al. | ................... | 348/555 |
| 6,330,036 B1 * | 12/2001 | Murakami et al. | .......... | 348/555 |
| 6,525,775 B1 * | 2/2003 | Kahn et al. | .................. | 348/460 |
| 6,553,072 B1 * | 4/2003 | Chiang et al. | .......... | 375/240.25 |
| 6,590,615 B2 * | 7/2003 | Murakami et al. | .......... | 348/555 |
| 6,628,677 B1 * | 9/2003 | Kobayashi | ................... | 370/535 |

(Continued)

FOREIGN PATENT DOCUMENTS

JP    2004-040696 A    2/2004

*Primary Examiner*—David Ometz
*Assistant Examiner*—Jean W Désir
(74) *Attorney, Agent, or Firm*—Foley & Lardner LLP

(57) ABSTRACT

A data broadcasting system is provided which is capable of achieving display intended and desired by a provider of data broadcasting contents. The data broadcasting system includes a transmitting system and a receiver. The transmitting system includes an HD (High Definition)/SD (Standard Definition) converting section to convert HDTV (High Definition Television) data contents into data contents having a resolution applicable to an SDTV (Standard Definition Television) monitor to obtain SDTV data contents and a multiplexing section to multiplex the SDTV data contents, HDTV video contents, and HDTV data contents. The receiver has a multiplexing separation section to separate the data broadcasting contents received from the transmitting system into the SDTV data contents, the HDTV video contents, and the HDTV data contents, a down-scaling section to convert a resolution of the HDTV video contents into a resolution applicable to the SDTV monitor to obtain SDTV video contents, and a video/data synthesizing section to synthesize the SDTV video contents and the SDTV data contents to obtain display data to be used in the SDTV monitor.

49 Claims, 18 Drawing Sheets

U.S. PATENT DOCUMENTS 6,728,317 B1 * 4/2004 Demos .................. 375/240.21
7,173,669 B2 * 2/2007 Choi .......................... 348/555
7,173,674 B2 * 2/2007 Takashimizu et al. ....... 348/725

* cited by examiner (a)  (b)

(a) for HDTV Monitor
```
<bml>
<body>
<object data="abc.png" style="width:100px;height:80px"/>
. . . .
</body>
</bml>
```
Display size is specified.
Display image Conversion (b) for SDTV Monitor
```
<bml>
<body>
<object data="abc.png" style="width:66px;height:53px"/>
. . . .
</body>
</bml>
```

(a)      (b)

(a)

| Code | Stock name | Opening price | Highest price | Closing price | Present price | Change |
|------|-----------|---------------|---------------|---------------|---------------|--------|
| XXX1 | ○○○ | 142 | 149 | 146 | 147 | 0 |
| XXX2 | △△△ | 78 | 80 | 76 | 78 | 0 |
| ⋮ | ⋮ | ⋮ | ⋮ | ⋮ | ⋮ | ⋮ |

(b)

| Code | Stock name | Opening price | Highest level | Closing price | Present price | Change |
|------|-----------|---------------|---------------|---------------|---------------|--------|
| XXX1 | ○○○ | 142 | 149 | 146 | 147 | 0 |
| XXX2 | △△△ | 78 | 80 | 76 | 78 | 0 |
| ⋮ | ⋮ | ⋮ | ⋮ | ⋮ | ⋮ | ⋮ |

DATA BROADCASTING SYSTEM, AND DATA BROADCASTING CONTENTS TRANSMITTING SYSTEM, RECEIVER, AND FORMAT CONVERTING METHOD USED IN SAME

BACKGROUND OF THE INVENTION

1. Field of the Invention

The present invention relates to digital broadcasting and more particularly to a data broadcasting system that can handle broadcasting data in a Hi-Vision format and to a data broadcasting contents transmitting system, a receiver, and a format converting method used in same.

The present application claims priority of Japanese Patent Application No. 2004-089004 filed on Mar. 25, 2004, which is hereby incorporated by reference.

2. Description of the Related Art

In recent years, attention is being focused on data broadcasting service provided by ground wave digital broadcasting. The data broadcasting service is service in which videos and/or voices to be broadcast on television are transmitted by ground waves and, at the same time, data broadcasting programs made up of images (including pictures), characters, or a like are transmitted. The data broadcasting programs include news, traffic information, weather information, stock-price information, or a like. In order to receive such digital broadcasts, a specially-designed receiver called an IRD (Integrated Receiver/Decoder) is used.

Ordinarily, the IRD can be connected to two types of monitors including an HDTV (High Definition Television) monitor and an SDTV (Standard Definition Television) monitor. There are two types of digital broadcasting formats, one being an HDTV format and another being an SDTV format. In the case of operations of the IRD, if a broadcasting format of a received video signal being not applicable to a monitor being connected then, a format of the received video signal is converted. For example, in a state in which the SDTV monitor is connected to the IRD, when the IRD receives a video signal in the HDTV format, a conversion called a "down-conversion" is performed in which the received video signal in the HDTV format is converted into a video signal having an optimum resolution enabling the SDTV monitor to display the video signal. On the contrary, in a state in which the HDTV monitor is connected to the IRD, when the IRD receives a video signal in the SDTV format, a conversion called an "up-conversion" is performed in which the received video signal in the SDTV format is converted into the video signal having an optimum resolution enabling the HDTV monitor to display the video signal (see Japanese Patent Application Laid-open No. Hei 2004-40696.

FIG. 20 is a block diagram schematically showing configurations of a conventional data broadcasting system. The data broadcasting system employs the HDTV broadcasting format and has a transmitting system 100 to transmit data broadcasting contents and a receiver (IRD) 200 to receive data broadcasting contents transmitted from the transmitting system 100.

The transmitting system 100 includes a multiplexing section 103 to receive preset HDTV video contents 101 and HDTV data contents 102 and to multiplex these HDTV video contents 101 and HDTV data contents 102 and a modulating section 104 to modulate the multiplexed contents, and an RF (Radio Frequency) signal transmitting section 105 to transmit the modulated contents (data broadcasting contents). The HDTV video contents 101 are made up of a video signal for the HDTV and voice data. The HDTV data contents 102 are contents of data broadcast to be transmitted in synchronization with the HDTV video contents which contains data such as images (pictures) and characters.

The IRD 200 includes an RF signal receiving section 201 to receive data broadcasting contents transmitted from the transmitting system 100, a demodulating section 202 to demodulate the received data broadcasting contents, a multiplexing separation section 203 to separate the demodulated contents into HDTV video contents 204 and HDTV data contents 205, a video/data synthesizing section 206 to synthesize the HDTV video contents 204 and HDTV data contents 205 to obtain HDTV display data, an HDTV outputting terminal 207 to output HDTV display data to an outside, an SDTV outputting terminal 209 to output the SDTV display data to an outside, and a down-scaling section 208 to down-scale the HDTV display data (that is, to down-convert) to a resolution applicable to the SDTV monitor to obtain SDTV display data.

In the above data broadcasting system, if the HDTV monitor is connected to the HDTV outputting terminal 207 of the IRD 200, the HDTV display data is displayed, as it is, on the HDTV monitor. On the other hand, when the SDTV monitor is connected to the SDTV outputting terminal 209 of the IRD 200, the SDTV display data that can be obtained by down-scaling the HDTV display data is displayed in the SDTV monitor.

However, the conventional data broadcasting system is operated in a manner in which SDTV display data is obtained by down-scaling HDTV display data and, therefore, has following problems.

In the process of down-scaling HDTV display data, in order to obtain SDTV display data, information about the HDTV display data is partially trimmed down. As a result, information about data (video contents and data contents) to be displayed on the SDTV monitor is partially lost. The partial losing of information exerts little influence on displaying of video contents due to characteristics of eyes of a human, but exerts influence on displaying of data contents; that is, a problem of degradation in quality such as deformation of characters and/or pictures occurs.

FIG. 21 is a diagram for schematically illustrating degradation in image quality of data contents caused by the down-scaled process described above. In the example shown in FIG. 21, SDTV display data is obtained by partially deleting, on every unit scanning line, HDTV display data in which a character "A" is largely displayed in a center of a display screen. As a result, if SDTV display data is displayed on the SDTV monitor, a deformed character "A" is displayed. Such deformation of a character can be easily recognized in particular.

Moreover, in recent years, an object synchronizing data broadcasting system by which an object (person or thing) contained in an image to be broadcast and its related data are transmitted with the object being associated with data is developed and is partially put in practical use. In the object synchronizing data broadcasting system, when an object on a display screen, for example, a work of art is input by a pointer or a like in a specified manner, detailed information about the work of art (name and history of the art object, place being presently exhibited, or a like) is displayed on the display screen. If such object synchronizing data broadcasting system is applied to a digital broadcast in the HDTV format, following problems caused by a down-scaled process occur.

That is, in the transmitting system 100, HDTV display data and object synchronizing data (data contents) obtained by associating information about a position of an object contained in the HDTV display data and its detailed information are transmitted all together. The information about a position of an object is information about the position where the object is to be displayed on the display screen and the detailed information about the object is displayed in a manner to be linked to the position of the object to be displayed. However, when the down-scaled HDTV display data is displayed on the SDTV monitor, since information about video contents is missing, a position of the object on the display screen is not properly linked to its detailed information. As a result, a problem occurs that, even if the object is input in a specified manner, the detailed information about the object is not correctly displayed on the display screen of the SDTV monitor.

FIG. 22 is a diagram schematically showing a relation among object synchronizing data, HDTV display data, and SDTV display data. In the example, HDTV display data 301 is produced from broadcast contents 300 obtained by multiplexing HDTV video contents and HDTV data contents and SDTV display data 302 is produced by down-scaling the HDTV display data 301. Moreover, object synchronizing position data 303 is produced from the HDTV video contents.

When the HDTV display data 301 is displayed on the HDTV monitor, a position of the object and the object synchronizing data 303 are linked to each other and, therefore, if an object is input in a specified manner, detailed information about the object is displayed correctly. On the other hand, if the SDTV display data 302 obtained by down-scaling the HDTV display data 301 is displayed on the SDTV monitor, due to a loss of information, the position of the object on a display screen and the object synchronizing position data are not linked correctly. As a result, when an object is input in a specified manner, detailed information about the object is not displayed correctly.

Thus, the above conventional method in which SDTV display data is obtained by down-scaling HDTV display data has a problem. That is, if the conventional method is used, due to a loss of information, it is impossible to achieve displaying intended and desired by a provider (broadcaster) of data broadcasting contents.

SUMMARY OF THE INVENTION

In view of the above, it is an object of the present invention to provide a data broadcasting system which is capable of achieving displaying intended and desired by a provider of data broadcasting contents, and to provide a data broadcasting contents transmitting system, a receiver, and a format converting method used in same.

According to a first aspect of the present invention, there is provided a data broadcasting system including:

a transmitting system to transmit data broadcasting contents containing at least video contents and data contents in a Hi-Vision format; and a receiver to which either of a Hi-Vision monitor enabling display in the Hi-Vision format or a standardized monitor having a resolution being different from that of the Hi-Vision monitor is able to be selectively connected;

wherein the transmitting system includes:

a standardized data producing unit to produce standardized data to be displayed on the standardized monitor corresponding to the data contents in the Hi-Vision format; and a multiplexing unit to multiplex the standardized data contents produced by the standardized data producing unit and the video contents and the data contents in the Hi-Vision format, thereby obtaining the data broadcasting contents;

wherein the receiver includes:

a multiplexing separation unit to separate the data broadcasting contents having been received from the transmitting system into the video contents and the data contents in the Hi-Vision format and the standardized data contents;

a first video/data synthesizing unit to synthesize the video contents and the data contents in the Hi-Vision format separated by the multiplexing separation unit, thereby obtaining display data contents to be displayed on the Hi-Vision monitor;

a first down-scaling unit to convert the video contents in the Hi-Vision format separated by the multiplexing separation unit into a video contents having a resolution being applicable to the standardized monitor, thereby obtaining standardized video contents; and a second video/data synthesizing unit to synthesize the standardized data contents separated by the multiplexing separation unit and the standardized video contents obtained by the first down-scaling unit, thereby obtaining display data contents to be displayed on the standardized monitor.

By configuring as above, data to be displayed on the standardized monitor is produced not by partially trimming down information to be displayed in the Hi-Vision format obtained by synthesizing video contents and data contents in the Hi-Vision format, but by using standardized data produced to be used for the standardized monitor and a standardized video obtained by down-scaling video contents in the Hi-Vision format. In this method, though a loss of information about the video occurs, no loss occurs in information about data. Therefore, display intended and desired by a provider of data broadcasting contents is made possible.

In the foregoing, a preferable mode is one wherein the standardized data producing unit includes a converting unit to convert the data contents in the Hi-Vision format into data contents having a resolution being applicable to the standardized monitor, thereby obtaining the standardized data contents.

By configuring as above, standardized data converted so as to have a resolution being applicable to the standardized monitor is used and, therefore, no loss occurs in the information about the data.

Also, a preferable mode is one that wherein includes:

a first object extracting unit to extract a first object from the video contents in the Hi-Vision format, thereby obtaining information about a position of the first object; and a first object synchronizing data producing unit to produce a Hi-Vision object synchronizing data obtained by associating the information about the position of the first object acquired by the first object extracting unit with detailed information about the first object being provided in advance and to feed the produced Hi-Vision object synchronizing data as the data contents in the Hi-Vision format to the multiplexing unit;

wherein the standardized data producing unit includes:

a second down-scaling unit to convert the video contents in the Hi-Vision format into video contents having a resolution being applicable to the standardized monitor, thereby obtaining a standardized video contents;

a second object extracting unit to extract a second object from the standardized video contents obtained by the second down-scaling unit, thereby obtaining information about a position of the second object; and a second object synchronizing data producing unit to produce standardized object synchronizing data obtained by associating information about the position of the second object acquired by the second object extracting unit with detailed information about the second object provided in advance and to feed the produced standardized object synchronizing data as the standardized data contents to the multiplexing unit.

By configuring as above, the standardized object synchronizing data is correctly linked to the position of the object to be displayed on the display screen of the standardized monitor and, therefore, such a problem that detailed information is not correctly displayed when the object is input in a specified manner does not occur.

According to a second aspect of the present invention, there is provided a data broadcasting system including:

a transmitting system to transmit data broadcasting contents containing video contents and data contents in a Hi-Vision format; and a receiver to which either of a Hi-Vision monitor enabling display in the Hi-Vision format or a standardized monitor having a resolution being different from that of the Hi-Vision monitor is able to be selectively connected;

wherein the receiver includes:

a multiplexing separation unit to separate data broadcasting contents having received from the transmitting system into video contents and data contents in the Hi-Vision format;

a first video/data synthesizing unit to synthesize the video contents and the data contents in the Hi-Vision format separated by the multiplexing separation unit, thereby obtaining display data contents to be displayed on the Hi-Vision monitor;

a down-scaling unit to convert the video contents in the Hi-Vision format separated by the multiplexing separation unit into video contents having a resolution being applicable to the standardized monitor, thereby obtaining standardized video contents; and a converting unit to convert data contents in the Hi-Vision format separated by the multiplexing separation unit into data contents having a resolution being applicable to the standardized monitor, thereby obtaining standardized data contents; and a second video/data synthesizing unit to synthesize the standardized data contents obtained by the converting unit and the standardized video contents acquired by the down-scaling unit, thereby obtaining display data contents to be displayed on the standardized monitor.

By configuring as above, data to be displayed on a standardized monitor is produced by using standardized data produced to be used for the standardized monitor and, therefore, no loss occurs in information about data. As a result, displaying intended and desired by a provider of data broadcasting contents is obtained.

In the foregoing, a preferable mode is one wherein the converting unit converts a specified description contained in a BML (Broadcast Markup Language) document being data in the Hi-Vision format into a description having a resolution being applicable to the standardized monitor.

Also, a preferable mode is one wherein the specified description is a description about a size of a font of a character to be displayed on a monitor screen.

Also, a preferable mode is one wherein the specified description is a description about a type of a font of a character to be displayed on a monitor screen.

Also, a preferable mode is one wherein the specified description is a description about a size of a picture to be displayed on a monitor screen.

Also, a preferable mode is one wherein the specified description is a description about a position in which a character or picture is displayed on a monitor screen.

Also, a preferable mode is one wherein the specified description is a description about a width of a line in a table to be displayed on a monitor screen.

Also, a preferable mode is one wherein a plurality of standardized monitors each having a different display characteristic as the standardized monitor is able to be connected to the receiver and wherein the converting unit produces, as the plurality of standardized monitors, a plurality of pieces of standardized data being suitable to each display characteristic of the plurality of standardized monitors and wherein the second video/data synthesizing unit synthesizes each of the plurality of pieces of standardized data produced by the converting unit and the standardized video to obtain data to be displayed on each of the plurality of standardized monitors.

Also, a preferable mode is one wherein first and second standardized monitors each having a different aspect ratio as the standardized monitor are able to be connected and wherein the converting unit produces first and second standardized data being applicable to the first and second standardized monitors as the standardized data and wherein the second video/data synthesizing unit synthesizes each of the first and second standardized data and the standardized video to obtain data to be displayed on the first and second standardized monitors.

According to a third aspect of the present invention, there is provided a data broadcasting contents transmitting system for transmitting data broadcasting contents containing at least video contents and data contents in a Hi-Vision format to a receiver to which a Hi-Vision monitor enabling display of the Hi-Vision format and a standardized monitor having a revolution being different from that of the Hi-Vision monitor is able to be selectively connected including:

a standardized data producing unit to produce standardized data contents to be displayed on the standardized monitor corresponding to data contents in the Hi-Vision format; and a multiplexing unit to multiplex the standardized data contents produced by the standardized data producing unit and video contents and data contents in the Hi-Vision format, thereby obtaining the data broadcasting contents.

By configuring as above, the data broadcasting system of the present invention can be realized.

In the foregoing, a preferable mode is one wherein the standardized data producing unit includes a converting unit to convert data in the Hi-Vision format into data having a resolution being applicable to the standardized monitor to obtain the standardized data.

Also, a preferable mode is one wherein the converting unit converts a specified description contained in a BML document being data in the Hi-Vision format into a description having a resolution being applicable to the standardized monitor.

Also, a preferable mode is one wherein the specified description is a description about a font size of a character to be displayed on a monitor screen.

Also, a preferable mode is one wherein the specified description is a description about a font type of a character to be displayed on a monitor screen.

Also, a preferable mode is one wherein the specified description is a description about a size of a picture to be displayed on a monitor screen.

Also, a preferable mode is one wherein the specified description is a description about a position in which a character or picture is displayed on a monitor screen.

Also, a preferable mode is one wherein the specified description is a description about a width of a line in a table to be displayed on a monitor screen.

Also, a preferable mode is one wherein a plurality of standardized monitors each having a different display characteristic as the standardized monitor is able to be connected to the receiver and wherein the converting unit produces, as the plurality of standardized monitors, a plurality of pieces of standardized data being suitable to each display characteristic of the plurality of standardized monitors.

Also, a preferable mode is one wherein first and second standardized monitors each having a different aspect ratio as the standardized monitor are able to be connected to the receiver and wherein the converting unit produces first and second standardized data contents being applicable to the first and second standardized monitors as the standardized data contents.

Also, a preferable mode is one that wherein includes:

a first object extracting unit to extract a first object from the video contents in the Hi-Vision format, thereby obtaining information about a position of the first object; and a first object synchronizing data producing unit to produce Hi-Vision object synchronizing data obtained by associating the information about the position of the first object acquired by the first object extracting unit with detailed information about the first object being provided in advance and to feed the produced Hi-Vision object synchronizing data as the data contents in the Hi-Vision format to the multiplexing unit;

wherein the standardized data producing unit includes:

a down-scaling unit to convert the video contents in the Hi-Vision format into video contents having a resolution being applicable to the standardized monitor, thereby obtaining a standardized video contents;

a second object extracting unit to extract a second object from the standardized video contents obtained by the down-scaling unit, thereby obtaining information about a position of the second object; and a second object synchronizing data producing unit to produce standardized object synchronizing data obtained by associating information about the position of the second object acquired by the second object extracting unit with detailed information about the second object provided in advance and to feed the produced standardized object synchronizing data as the standardized data contents to the multiplexing unit.

According to a fourth aspect of the present invention, there is provided a receiver to which a Hi-Vision monitor enabling display of a Hi-Vision format and a standardized monitor having a resolution being different from that of the Hi-Vision monitor is able to be selectively connected including:

a receiving unit to receive data broadcasting contents obtained by multiplexing video contents and data contents in the Hi-Vision format and standardized data to be displayed on the standardized monitor corresponding to the standardized data contents;

a multiplexing separation unit to separate data broadcasting contents received by the receiving unit into the video contents and the data contents in the Hi-Vision format and the standardized data contents;

a first video/data synthesizing unit to synthesize the video contents and the data contents in the Hi-Vision format separated by the multiplexing separation unit, thereby obtaining display data contents to be displayed on the Hi-Vision monitor;

a down-scaling unit to convert video contents in the Hi-Vision format separated by the multiplexing separation unit into video contents having a resolution being applicable to the standardized monitor, thereby obtaining standardized video contents; and a second video/data synthesizing unit to synthesize the standardized data contents separated by the multiplexing separation unit and standardized video contents obtained by the down-scaling unit, thereby obtaining display data contents to be displayed on the standardized monitor.

By configuring as above, the data broadcasting system of the present invention can be realized.

According to a fifth aspect of the present invention, there is provided a receiver to which a Hi-Vision monitor enabling display of a Hi-Vision format and a standardized monitor having a resolution being different from that of the Hi-Vision monitor is able to be selectively connected including:

a receiving unit to receive data broadcasting contents obtained by multiplexing video contents and data contents in the Hi-Vision format;

a multiplexing separation unit to separate data broadcasting contents having received by the receiving unit into the video contents and the data contents in the Hi-Vision format;

a first video/data synthesizing unit to synthesize the video contents and the data contents in the Hi-Vision format separated by the multiplexing separation unit, thereby obtaining display data contents to be displayed on the Hi-Vision monitor;

a down-scaling unit to convert the video contents in the Hi-Vision format separated by the multiplexing separation unit into video contents having a resolution being applicable to the standardized monitor, thereby obtaining standardized video contents;

a converting unit to convert the data contents in the Hi-Vision format separated by the multiplexing separation unit into data contents having a resolution being applicable to the standardized monitor, thereby obtaining standardized data contents; and a second video/data synthesizing unit to synthesize standardized data contents obtained by the converting unit and the standardized video contents obtained by the down-scaling unit, thereby obtaining display data contents to be displayed on the standardized monitor.

By configuring as above, the data broadcasting system of the present invention can be realized.

In the foregoing, a preferable mode is one wherein the converting unit converts a specified description contained in a BML document being data in the Hi-Vision format into a description having a resolution being applicable to the standardized monitor.

Also, a preferable mode is one wherein the specified description is a description about a font size of a character to be displayed on a monitor screen.

Also, a preferable mode is one wherein the specified description is a description about a font type of a character to be displayed on a monitor screen.

Also, a preferable mode is one wherein the specified description is a description about a size of a picture to be displayed on a monitor screen.

Also, a preferable mode is one wherein the specified description is a description about a position in which a character or picture is displayed on a monitor screen.

Also, a preferable mode is one wherein the specified description is a description about a width of a line in a table to be displayed on a monitor screen.

Also, a preferable mode is one wherein the receiver is able to be connected to a plurality of standardized monitors each having a different display characteristic as the standardized monitor and wherein the converting unit produces, as the standardized monitor, a plurality of pieces of standardized data being suitable to each display characteristic of the plurality of standardized monitors and wherein the second video/data synthesizing unit synthesizes each of a plurality of pieces of standardized data produced by the converting unit and the standardized video to obtain data to be displayed on a plurality of standardized monitors.

Also, a preferable mode is one wherein the receiver is able to be connected to first and second standardized monitors each having a different aspect ratio as the standardized monitor and wherein the converting unit produces second standardized data being applicable to each of the first and second standardized monitors and the second video/data synthesizing unit synthesizes each of the first and second standardized monitors and the standardized video to obtain data to be displayed on each of the first and second standardized monitors.

According to a sixth aspect of the present invention, there is provided a format converting method to be employed in a data broadcasting system having a transmitting system to transmit data broadcasting contents containing at least video contents and data contents in a Hi-Vision format and a receiver being able to be selectively connected to either of a Hi-Vision monitor enabling display in the Hi-Vision format or a standardized monitor having a resolution being different from that of the Hi-Vision monitor, the format converting method including:

a first step in which the transmitting system transmits the data broadcasting contents obtained by multiplexing the video contents and the data contents in the Hi-Vision format and standardized data contents to be displayed on the standardized monitor corresponding to the data contents; and a second step in which the receiver separates the data broadcasting contents having been received from the transmitting system into the video contents and the data contents in the Hi-Vision format and standardized data contents and converts the separated video contents in the Hi-Vision format into video contents having a resolution being applicable to the standardized monitor, thereby obtaining standardized video contents and synthesizes the obtained standardized video contents and the separated standardized data contents, thereby obtaining display data contents to be displayed on the standardized monitor.

By using this method, the same effects as are obtained by the data broadcasting system of the present invention can be realized.

In the foregoing, a preferable mode is one wherein the first step contains a step of converting the data contents in the Hi-Vision format into data contents having a resolution being applicable to the standardized monitor, thereby obtaining the standardized data contents.

Also, a preferable mode is one wherein the first step further includes:

a step of extracting a first object from video contents in the Hi-Vision format to obtain information about a position of the first object and associating the obtained information about the position of the first object with detailed information about the first object provided in advance to produce Hi-Vision object synchronizing data being data contents in the Hi-Vision format;

a step of converting the video contents in the Hi-Vision format into video contents having a resolution being applicable to the standardized monitor, thereby obtaining standardized video contents; and a step of extracting a second object from the obtained standardized video contents to obtain information about a position of the second object and associating the obtained information about the position of the first object with detailed information about the second object provided in advance to produce standardized object synchronizing data being the standardized data contents.

According to a seventh aspect of the present invention, there is provided a format converting method to be employed in a receiver being able to be selectively connected to either of a Hi-Vision monitor enabling display in a Hi-Vision format or a standardized monitor having a resolution being different from that of the Hi-Vision monitor, the format converting method including:

a first step of receiving data broadcasting contents obtained by multiplying video contents and data contents in the Hi-Vision format;

a second step of separating the data broadcasting contents having been received in the first step into video contents and data contents in the Hi-Vision format;

a third step of converting the video contents in the Hi-Vision format separated in the second step into video contents having a resolution being applicable to the standardized monitor, thereby obtaining a standardized video contents;

a fourth step of converting the data contents in the Hi-Vision format separated in the second step into data contents having a resolution being applicable to the standardized monitor, thereby obtaining standardized data contents; and a fifth step of synthesizing the standardized data contents obtained in the fourth step and the standardized video contents obtained in the third step, thereby obtaining display data contents to be displayed on the standardized monitor.

By using this method, the same effects as are obtained by the data broadcasting system of the present invention can be realized.

With the above configuration, when data broadcasting contents in the Hi-Vision format are displayed on the standardized monitor, no loss of information about broadcasting data occurs and, therefore, display intended and desired by a provider of data broadcasting contents can be achieved and a broadcasting system having image quality being higher than a conventional level can be realized.

With another configuration, when standardized object synchronizing data is produced, if data broadcasting contents in a Hi-Vision format are displayed by a standardized monitor, detailed information about a specified object can be displayed correctly on a display screen.

BRIEF DESCRIPTION OF THE DRAWINGS

The above and other objects, advantages, and features of the present invention will be more apparent from the following description taken in conjunction with the accompanying drawings in which:

FIG. 2(b) is one example of a BML document for SDTV data contents that can be obtained by making the HD/SD conversion of the HDTV data contents shown in FIG. 2(a);

FIG. 3(b) is a diagram schematically showing a display screen of the SDTV data contents shown in FIG. 2(b);

FIG. 5(b) is one example of a BML document for SDTV data contents that can be obtained by making the HD/SD conversion of the HDTV data contents shown in FIG. 5(a);

FIG. 6(b) is a diagram schematically showing a display screen of the SDTV data contents shown in FIG. 6(b);

FIG. 8(b) is one example of a BML document for SDTV data contents that can be obtained by making the HD/SD conversion of the HDTV data contents shown in FIG. 8(a);

FIG. 9(b) is a schematic diagram illustrating SDTV data contents shown on the display screen;

FIG. 11(b) is one example of a BML document for SDTV data contents that can be obtained by making the HD/SD conversion of the HDTV data contents shown in FIG. 11(a);

FIG. 12(b) is a diagram illustrating a display screen of SDTV data contents shown in FIG. 11(b).

FIG. 15(b) is a diagram showing one example of a BML document of HDTV data contents having a screen ratio of "4:3";

DETAILED DESCRIPTION OF THE PREFERRED EMBODIMENTS

Best modes of carrying out the present invention will be described in further detail using various embodiments with reference to the accompanying drawings.

First Embodiment

Figure 1:
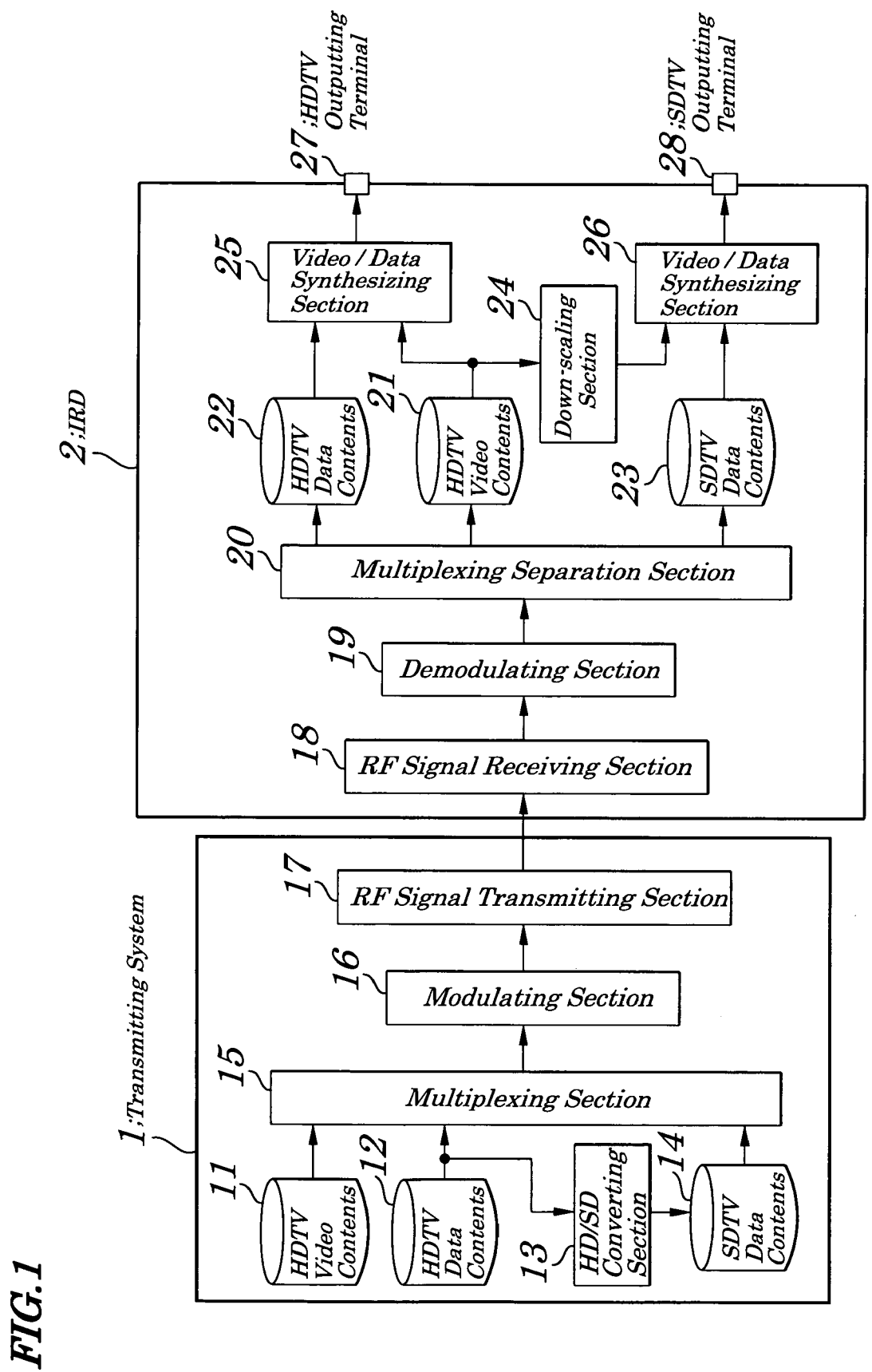
FIG. 1 is a block diagram schematically showing a data broadcasting system according to a first embodiment of the present invention.

FIG. 1 is a block diagram schematically showing a data broadcasting system of a first embodiment of the present invention. The data broadcasting system includes a transmitting system 1 to transmit data broadcasting contents and a receiver (hereinafter referred to as an IRD (Integrated Receiver/Decoder)) 2 to receive data broadcasting contents transmitted from the transmitting system 1.

The transmitting system 1 has a storage device (not shown) storing, in advance, HDTV video contents 11 and HDTV data contents 12, an HD/SD (High Definition/Standard Definition) converting section 13, a multiplexing section 15, a modulating section 16, and an RF signal transmitting section 17. The HDTV video contents 11 and the HDTV data contents 12 are read out from the storage device as appropriate. Out of the contents read from the storage device, the HDTV video contents 11 are fed to the multiplexing section 15 and the HDTV data contents 12 are fed to each of the multiplexing section 15 and the HD/SD converting section 13.

The HD/SD converting section 13 makes an HD/SD conversion (format conversion) of HDTV data contents 12 fed from the storage device to obtain SDTV data contents 14 and its output is fed to the multiplexing section 15.

The multiplexing section 15 multiplexes the HDTV video contents 11 and HDTV data contents 12 to be fed from the storage device and SDTV data contents 14 to be fed from the HD/SD converting section 13 and its output is fed to the modulating section 16. The modulating section 16 is used to modulate the multiplexed contents to be fed from the multiplexing section 15 and its output is fed to the RF signal transmitting section 17. The RF signal transmitting section 17 is used to transmit the modulated contents (data broadcasting contents) fed from the modulating section 16. The data broadcasting contents transmitted from the RF signal transmitting section 17 are received by the IRD 2.

The IRD 2 includes an RF signal receiving section 18, a demodulating section 19, a multiplexing separation section 20, a down-scaling section 24, video/data synthesizing sections 25 and 26, an HDTV outputting terminal 27, and an SDTV outputting terminal 28. The HDTV outputting terminal 27 is a connection terminal dedicated to operations of an HDTV monitor (not shown) and the SDTV outputting terminal 28 is a connection terminal dedicated to operations of an SDTV monitor (not shown).

The RF signal receiving section 18 receives data broadcasting contents transmitted from the transmitting system 1 and its content is fed to the demodulating section 19. The demodulating section 19 demodulates data broadcasting contents received by the RF signal receiving section 18 and its output is fed to the multiplexing separation section 20. The multiplexing separation section 20 separates data broadcasting contents fed from the demodulating section 19 into HDTV video contents 21, HDTV data contents 22, and SDTV data contents 23. Out of the separated contents, the HDTV data contents 22 are fed to the video/data synthesizing section 25 and the HDTV video contents 21 are fed to each of the video/data synthesizing section 25 and the down-scaling section 24 and the SDTV data contents 23 are fed to the video/data synthesizing section 26.

The video/data synthesizing section 25 synthesizes the HDTV video contents 21 and the HDTV data contents 22 fed from the multiplexing separation section 20 to produce HDTV display data. The produced HDTV display data is fed from the HDTV terminal 27 to an outside HDTV monitor.

The down-scaling section 24 is used to down-scale a resolution of the HDTV video contents 21 fed from the multiplexing separation section 20 so as to be applicable to an SDTV monitor, thereby producing SDTV video contents, and the output SDTV video contents are fed to the video/data synthesizing section 26. The video/data synthesizing section 26 is used to synthesize SDTV data contents 23 fed from the multiplexing separation section 20 and SDTV video contents fed from the down-scaling section 24 to produce SDTV display data. The produced SDTV display data is fed to an outside SDTV monitor from the SDTV outputting terminal 28.

Next, operations of the data broadcasting system of the first embodiment of the present invention will be described in detail.

In the transmitting system 1, when the HDTV video contents 11 and HDTV data contents 12 are read out from the storage device as appropriate, the HD/SD converting section 13 first makes an HD/SD conversion from the HDTV data contents 12 out of the read contents to SDTV data contents 14. Then, the multiplexing section 15 multiplexes the HDTV video contents 11 and the HDTV data contents 12 read out from the storage device and the SDTV data contents 14 output from the HD/SD converting section 13. The multiplexed contents are modulated by the modulating section 16 and are transmitted from the RF signal transmitting section 17 as data broadcasting contents.

In the IRD 2, data broadcasting contents transmitted from the transmitting system 1 are received by the RF signal receiving section 18. The received data broadcasting contents, after having been demodulated by the demodulating section 19, are separated into the HDTV video contents 21, HDTV data contents 22, and SDTV data contents 23 by the multiplexing separation section 20.

When an HDTV monitor is connected to the HDTV outputting terminal 27, the video/data synthesizing section 25 synthesizes the HDTV video contents 21 and HDTV data contents 22 separated by the multiplexing separation section 20 to produce HDTV display data. The HDTV display data thus produced is fed to the HDTV monitor connected to the HDTV outputting terminal 27. On the HDTV monitor, the HDTV display data fed through the HDTV outputting terminal 27 is displayed.

On the other hand, when the SDTV monitor is connected to the SDTV outputting terminal 28, the down-scaling section 24, after having down-scaled a resolution of HDTV video contents 21 separated by the multiplexing separation section 20 so as to be applicable to the SDTV monitor to produce SDTV video contents. Then, the video/data synthesizing section 26 synthesizes the SDTV data contents 23 separated by the multiplexing separation section 20 and SDTV video contents generated by the down-scaling section 24 to produce SDTV display data. The SDTV display data thus produced is fed to the SDTV monitor connected to the SDTV outputting terminal 28. On the SDTV monitor, SDTV display data fed from the SDTV outputting terminal 28 is displayed.

The feature of the data broadcasting system of the first embodiment of the present invention is that, in the transmitting system 1, SDTV data contents having a resolution applicable to the SDTV monitor are produced from the HDTV data contents transmitted in synchronization with the HDTV video contents and the produced SDTV data contents are multiplexed and then transmitted with HDTV video contents and HDTV data contents and in that, in the IRD 2, when the SDTV monitor is connected, by synthesizing SDTV video contents having been obtained by down-scaling HDTV video contents and SDTV data contents having received from the transmitting system 1, SDTV display data is produced. According to this feature, unlike in the conventional case in which, by down-scaling HDTV display data obtained by synthesizing HDTV video contents and HDTV data contents, SDTV display data is produced and, therefore, an excellent displayed image being free from deformation in characters or a like can be obtained.

There are several methods for the HD/SD conversion to be performed by the HD/SD converting section 13 to convert HDTV data contents into SDTV data contents. A concrete example of the HD/SD conversion is described below.

FIRST EXAMPLE OF HD/SD CONVERSION

A method for converting a font size and type of a character contained in HDTV data contents into those applicable to an SDTV monitor is explained.

Figure 2:
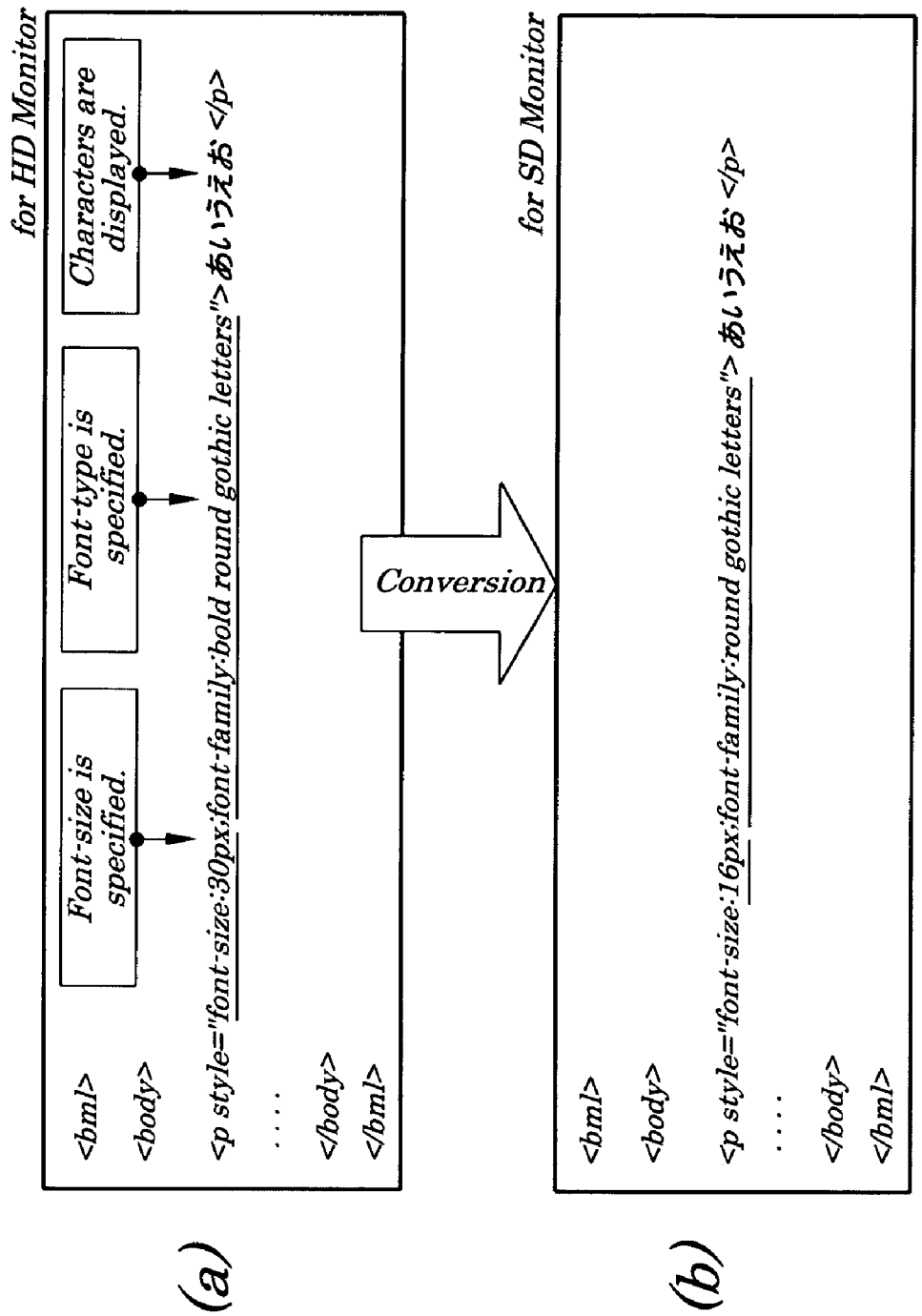
FIG. 2 is a diagram illustrating a first example of an HD/SD conversion to be made in the data broadcasting system shown in FIG. 1; the FIG. 2(a) is one example of a BML (Broadcast Markup Language) document for HDTV data contents.
Figure 3:
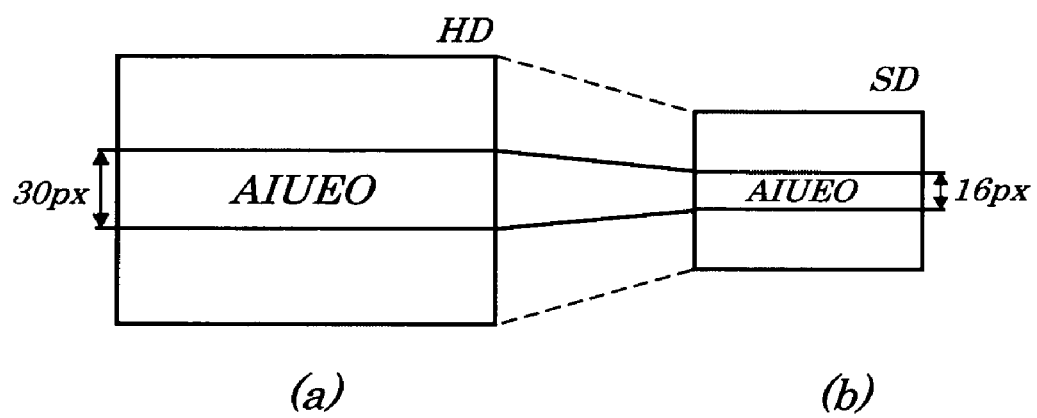
FIG. 3 is a diagram schematically showing a display screen of the TV data contents; the FIG. 3(a) is a diagram schematically showing a display screen of the HDTV data contents shown in FIG. 2(a)

FIG. 2 is a diagram illustrating a first example of the HD/SD conversion in which the FIG. 2(*a*) is one example of a BML (Broadcast Markup Language) document for HDTV data contents and FIG. 2(*b*) is one example of a BML document for SDTV data contents that can be obtained by making the HD/SD conversion of the HDTV data contents shown in FIG. 2(*a*). In FIG. 3, FIG. 3(*a*) is a diagram schematically showing a display screen of the HDTV data contents shown in FIG. 2(*a*), and FIG. 3(*b*) is a diagram schematically showing a display screen on which the SDTV data contents shown in FIG. 2(*b*) is displayed.

As shown in FIG. 2(*a*), the BML document for the HDTV data contents contains a description "font-size:30 px" that specifies a font size, a description "font-family; bold round Gothic letters" that specifies a font family, and a description "あいうえお" (a i u e o) of Japanese Hiragana characters to be displayed. In this example case, as shown in FIG. 3(*a*), Japanese Hiragana characters "あいうえお" (a i u e o) having the font size of 30 px (pixel) and a font type of "bold round Gothic letters" are displayed on an HDTV monitor.

In the HD/SD converting section 13, a description of the BML document for the HD/SD contents as shown in FIG. 2(*a*) is converted into a description applicable to an SDTV monitor as shown in FIG. 2(*b*). In the example shown in FIG. 2(*b*), the font size is converted from "30 px" into "16 px" and the font type is converted from "bold round Gothic letters" into "round Gothic letters". In this case, as shown in FIG. 3(*b*), Japanese Hiragana characters "あいうえお" having a font size of "16 px" and a font type of "round Gothic letters" are displayed on the SDTV monitor screen. Thus, by directly making the HD/SD conversion of a description in which a size and type of a character contained in the BML document are specified, excellent display on the display screen being free from deformation of characters in the BML document can be achieved.

Figure 4:
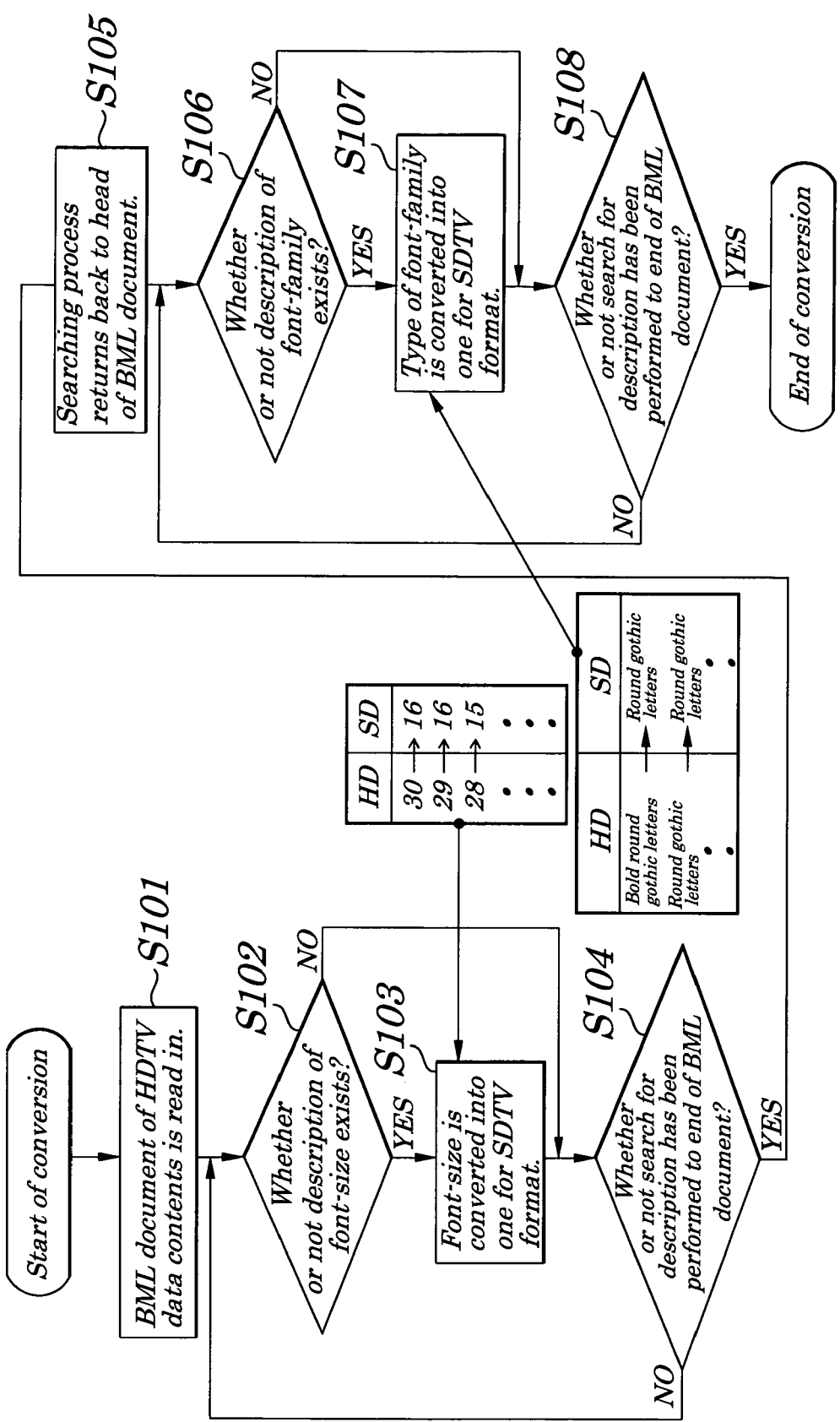
FIG. 4 is a flowchart showing procedures of a first example of the HD/SD conversion to be made in the data broadcasting system shown in FIG. 1.

FIG. 4 is a diagram showing one example of making an HD/SD conversion of a description in which a size and/or type of a character contained in a BML document both are specified. In the example, the HD/SD converting section 13 has a first HD/SD conversion table for a font size and a second HD/SD conversion table for a font family and makes the HD/SD conversion by using these tables by following procedures. The first HD/SD conversion table stores information about a font size for each of a plurality of HDTV formats in a manner in which each of the font sizes is associated with a font size of a corresponding SDTV format. The second HD/SD conversion table stores information about a type of a font for each of a plurality of HDTV formats in a manner in which each type of the font is associated with a type of a font of a corresponding SDTV format.

First, BML document for HDTV data contents is read in Step S101, and whether a description about a font size exists in the BML document (Step S102) is checked. If the description of the font size exists, the description is converted into the description about a font size for an SDTV format by using the first HD/SD conversion table (Step S103). Whether or not a search for a description of a font size has been performed to an end of the BML document is checked (Step S104). If the result from the above check is "NO", the routine returns back to Step S102 and, if "YES", the searching process returns back to a head of the BML document (Step S105). If no description about a font size in Step S102 exists, a process in Step S103 is not performed and the routine proceeds to Step S104.

When the searching process returns back to the head of the BML document in Step S105, whether or not a description about a font family exists is checked (Step S106). If a description about a type of a font exists, the description is converted into a description about a font family applicable to an SDTV format by using the second HD/SD conversion table (Step S107). Then, whether or not a search for a description about a font family has been performed to an end of the BML document is checked (Step S108). In the above checking, if the result is "NO", the routine returns back to Step S106 and, if the result is "YES", the HD/SD conversion is terminated. If no description about a font family exists in Step S106, a process in Step S107 is not performed and the routine proceeds to Step S108.

In the above HD/SD converting processing, both a size and a type of a font are converted, however, the data broadcasting system may be configured so that either of a size or type of a font may be converted.

SECOND EXAMPLE OF HD/SD CONVERSION

A method for converting a position in which a character and/or a picture in HDTV data contents are displayed into a position in which the character and/or picture can be properly displayed in an SDTV monitor is explained.

Figure 5:
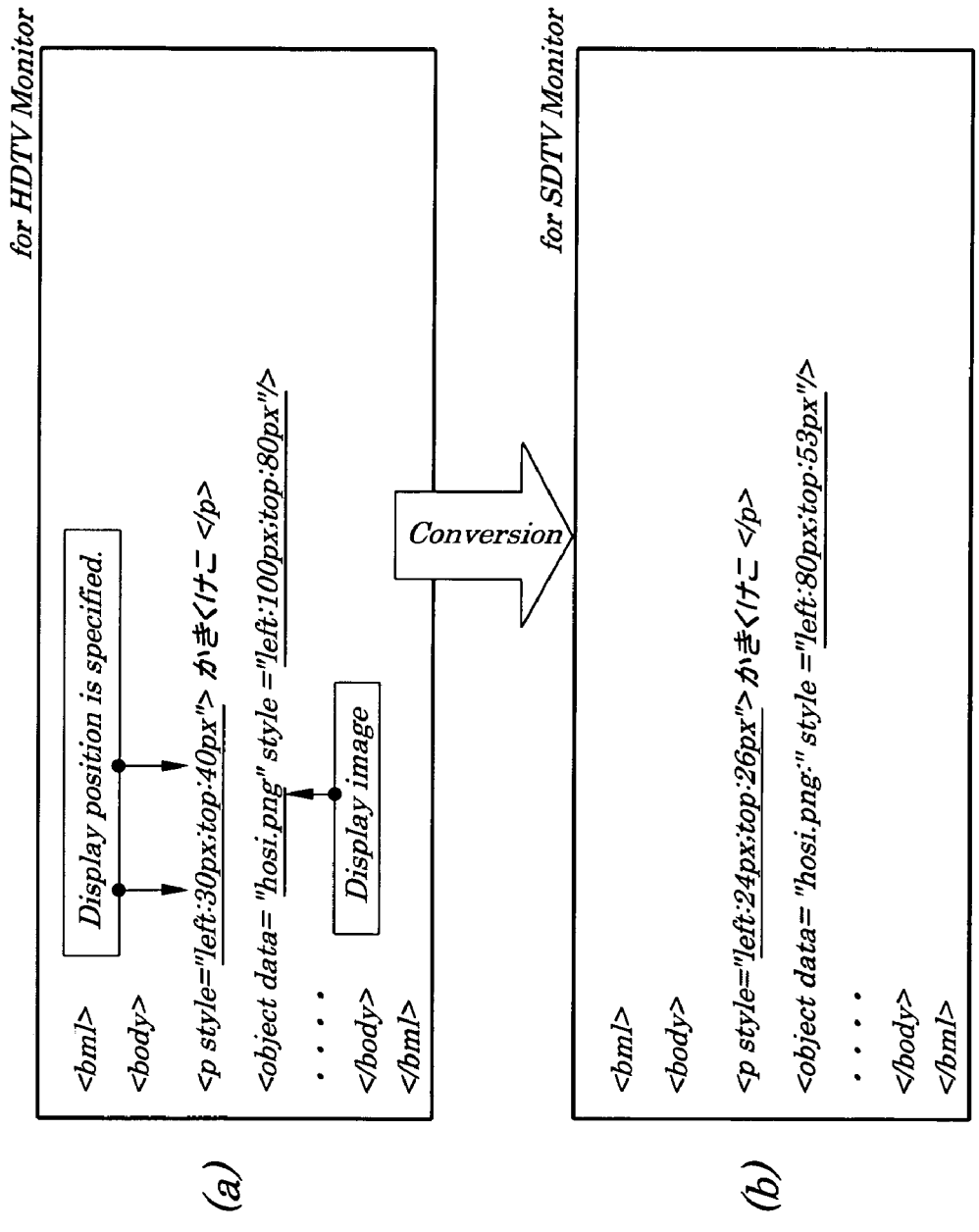
FIG. 5 is a diagram illustrating a second example of the HD/SD conversion; the FIG. 5(a) is one example of a BML document for HDTV data contents.
Figure 6:
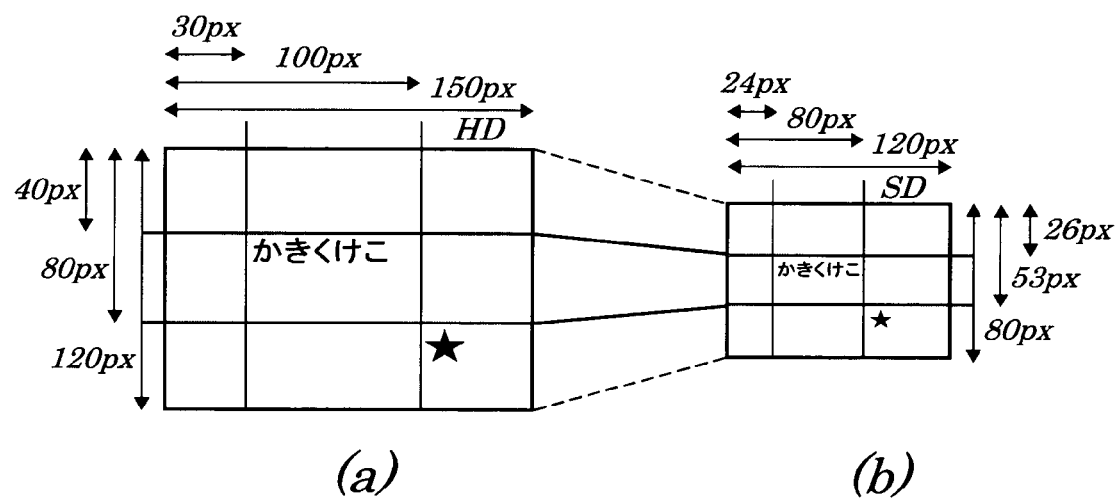
FIG. 6 is a diagram schematically showing a display screen of the TV data contents; the FIG. 6(a) is a diagram schematically showing a display screen of the HDTV data contents shown in FIG. 5(a)

FIG. 5 is a diagram illustrating a second example of the HD/SD conversion; and the FIG. 5(*a*) is one example of a BML document for HDTV data contents, and FIG. 5(*b*) is one example of a BML document for SDTV data contents that can be obtained by making the HD/SD conversion of the HDTV data contents shown in FIG. 5(*a*). In FIG. 6, the FIG. 6(*a*) is a diagram schematically showing a display screen on which the HDTV data contents shown in FIG. 5(*a*) are shown and FIG. 6(*b*) is a diagram schematically showing a display screen on which the SDTV data contents shown in FIG. 5(*b*) are shown.

As shown in FIG. 5(*a*), the BML document for the HDTV data contents contains a description [<p style="left:30px;top:40px"> かきくけこ</P>] that specifies a position in which a character is displayed and a description [<object data="hosi.png" style="left: 100px;top:80px"/>] that specifies a position in which a picture is displayed. In the example, as shown in FIG. 6(*a*), on an HDTV monitor (120 px by 150 px), Japanese Hiragana characters "かきくけこ" (ka ki ku ke ko) are displayed in a place beginning on a position being 40 px from an upper edge position and being 30 px from a left edge position and a star is displayed in a place being 80 px from the upper edge position and being 100 px from the left edge position.

In the HD/SD converting section 13, the display position in the BML document shown in FIG. 5(*a*) is converted, by multiplying a value of the display position by a specified ratio, into a display position applicable to the SDTV monitor as shown in FIG. 6(*b*). The specified ratio here denotes a ratio of a resolution in each of a width and height between a display screen of the HDTV monitor and a display screen of the SDTV monitor. In the example of the HD/SD conversion shown in FIG. 5(*a*) and FIG. 5(*b*), an aspect ratio (height-to-width ratio) of a display screen of the HDTV monitor is 3:5 and an aspect ratio of a display screen of the SDTV monitor is 2:4. A ratio of a resolution in a height in the display screen between the HDTV monitor and SDTV monitor is 2/3 and a ratio of a resolution in a width in the display screen between the HDTV monitor and SDTV monitor is 4/5. In the example shown in FIG. 5(*b*), in the description that specifies a position of a character, a value of "left" is calculated as follows.

$$30\ px \times (4/5) = 24\ px$$

A value of "top" is calculated as follows:

$$40\ px \times (2/3) = 26\ px$$

(decimal values are dropped retaining only whole number).

Also, in the description that specifies a position of a picture is displayed, a value of "left" is calculated as follows:

$$100\ px \times (4/5) = 80\ px$$

and a value of "top" is calculated as follows:

$$80\ px \times (2/3) = 53\ px$$

(decimal values are dropped retaining only whole number).

In the example of the description shown in FIG. 5(*b*), as shown in FIG. 6(*b*), on an SDTV monitor (80 px by 120 px), Japanese Hiragana characters "かきくけこ" (ka ki ku ke ko) are displayed in a place beginning on a portion being 26 px from an upper edge position and being 24 px from a left edge position and a star is displayed in a place being 53 px from the upper edge position and 80 px from the left edge position. Thus, by making the direct HD/SD conversion of a description that specifies a position of a character and/or picture in a BML document, excellent display on a display screen being free from deformation of a character and/or picture can be achieved.

Figure 7:
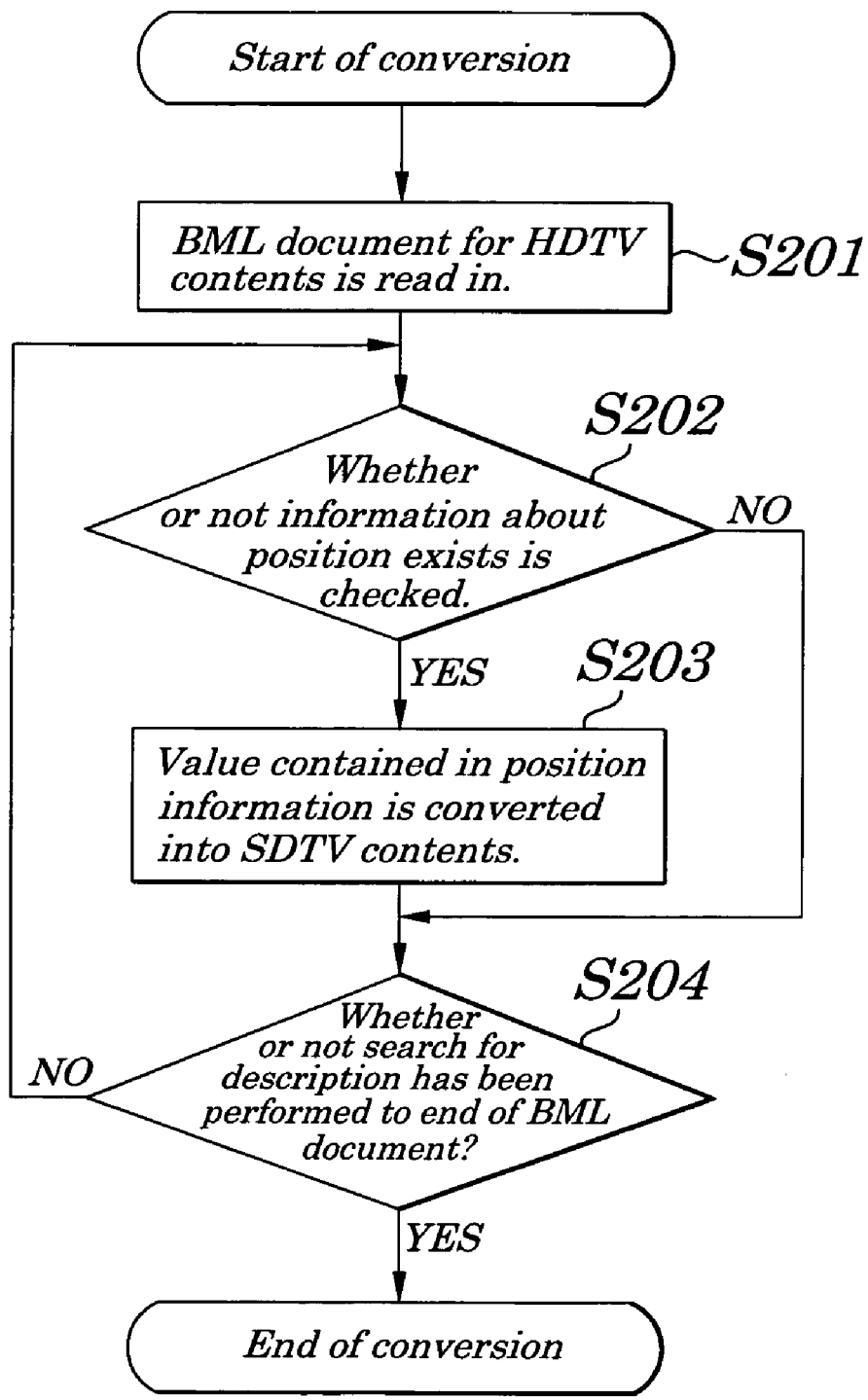
FIG. 7 is a flowchart showing procedures of the second example of the HD/SD conversion to be made in the data broadcasting system shown in FIG. 1.

FIG. 7 shows one example of procedures for the HD/SD conversion of a description that specifies a position of a character and/or picture contained in a BML document. In the example, the HD/SD converting section 13 is provided with a preset ratio of the resolution in a width and a preset ratio of the resolution in a height. The HD/SD converting section 13 makes the HD/SD conversion by procedures described below.

First, BML document for HDTV data contents is read in Step S201, and whether or not information about a position of a character and/or picture exists in the BML document is checked (Step S202). If a description about information about a position of a character and/or picture exists, the description is converted into a description of information about a position for the SDTV contents (Step S203). More specifically, a value of the "top" of position information for HDTV data contents is multiplied by a preset ratio of a resolution of a height and a value of "left" of position information is multiplied by a preset ratio of a resolution of a width. After the conversion, whether or not a search for the description about a font size has been performed to an end of a BML document is checked (Step S204). In the above check, if the result is "No", the routine returns back to Step S202 and if the result is "YES", the HD/SD conversion is terminated. When no description about a font size exists, a process in Step S203 is not performed and the routine proceeds to Step S204.

THIRD EXAMPLE OF HD/SD CONVERSION

A method for converting a size of a picture contained in HDTV data contents into a size of a picture being applicable to an SDTV monitor is explained with reference with FIG. 8.

Figure 8:
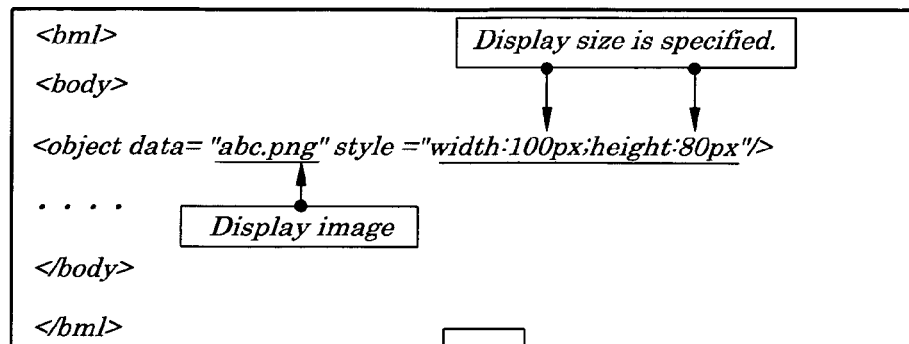
FIG. 8 is a diagram illustrating a third example of the HD/SD conversion; the FIG. 8(a) is one example of a BML document for HDTV data contents.
Figure 9:
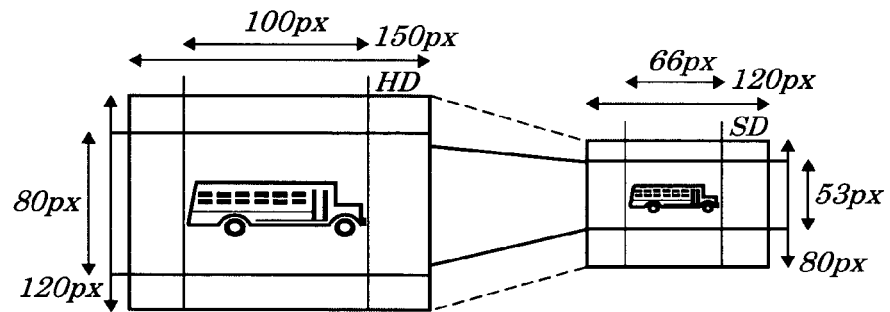
FIG. 9 is a diagram schematically illustrating TV data contents shown on a display screen; the FIG. 9(a) is a diagram schematically illustrating HDTV data contents shown on a display screen.

In FIG. 8, the FIG. 8(a) and FIG. 8(b) are diagrams illustrating a third example of the HD/SD conversion and FIG. 8(a) is one example of a BML document for HDTV data contents, and FIG. 8(b) is one example of a BML document for SDTV data contents that can be obtained by making the HD/SD conversion of the HDTV data contents shown in FIG. 8(a). In FIG. 9, the FIG. 9(a) schematically shows a display screen of HDTV data contents shown in FIG. 8(a) and FIG. 9(b) schematically shows a display screen of SDTV data contents shown in FIG. 8(b).

As shown in FIG. 8(a), a BML document for the HDTV data contents has a description [<object data="abc.png"style="width:100px;height:80px"/>] that specifies a size of a picture. In the case of the above example, as shown FIG. 9(a), on a display screen of the HDTV monitor (120 px by 150 px), a picture having a size of 80 px (in height) by 100 px (in width) being specified by "abc.png" is displayed (a display screen of a vehicle is shown in FIG. 9).

In the HD/SD converting section 13, a size (a height size and a width size) of a picture in the BML document shown in FIG. 8(a) is converted, by multiplying a value of the display position by a specified ratio, into a display position applicable to the SDTV monitor. As described in the example of the second HD/SD conversion, the specified ratio here denotes a ratio of a resolution in a width and height of each display screen of the HDTV monitor and of the SDTV monitor. To maintain an aspect ratio in the original picture size, only a ratio of the resolution of a width or height is used in a fixed manner. In the first embodiment, the description that specifies a picture size is converted by using the ratio (2/3) of the height resolution as the specified ratio as shown in FIG. 8(b). More specifically, in the description that specifies a size of a picture, a value of the "width" is calculated as follows:

$$100 \text{ px} \times (2/3) = 66 \text{ px}$$

(decimal values are dropped retaining only whole number).
A value of the "height" is calculated as follows:

$$80 \text{ px} \times (2/3) = 53 \text{ px}$$

(decimal values are dropped retaining only whole number).

In the case of the description shown in FIG. 8(b), as shown in FIG. 9(b), a picture (of vehicle) having a size of 53 px in height and 66 px in width is displayed on a display screen of the SDTV monitor (80 px by 120 px). Thus, by making an HD/SD conversion of a description that specifies a size, excellent display on a display screen being free from deformation of a picture can be achieved.

Figure 10:
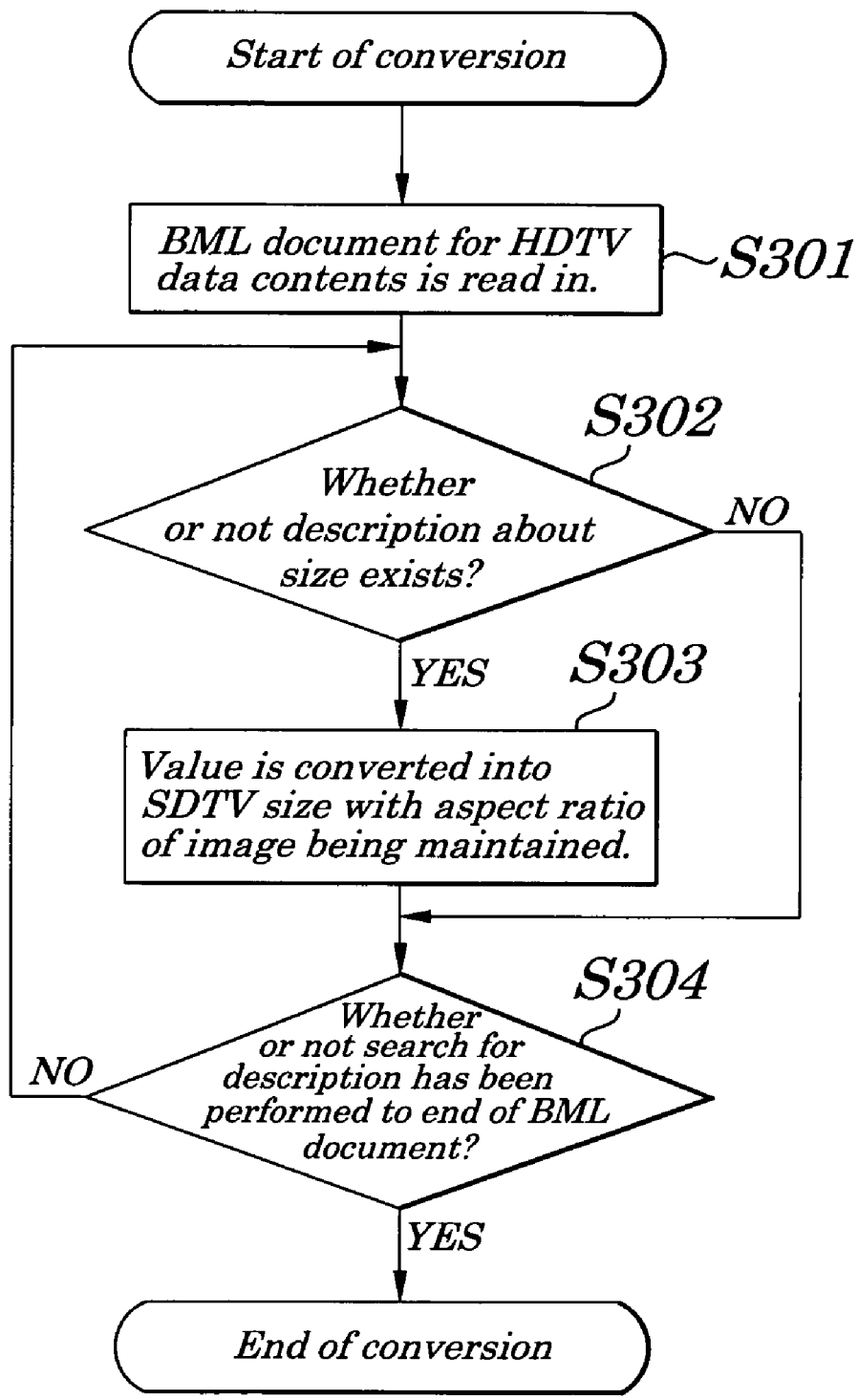
FIG. 10 is a flowchart showing procedures of a third example of the HD/SD conversion employed in the data broadcasting system shown in FIG. 1.

FIG. 10 shows one example of procedures for making the HD/SD conversion of a description that specifies a size of a picture in the BML document. In the example, in the HD/SD converting section 13, a ratio (2/3) of a resolution of a height is preset and the HD/SD conversion is made by following procedures.

First, BML document for HDTV data contents is read in Step S301, and whether or not a description about a size of a picture exists in its BML document is checked (Step S302). When the description about a size of a picture exists, the description is converted into a description applicable to the SDTV monitor (Step S303). More specifically, a ratio (2/3) of a resolution of a height is multiplied by each value of a "width" and "height" of a picture for HDTV displaying. After the conversion, whether or not a search for a description of a size of a picture has been performed to an end of a BML document is checked (Step S304). If the result from the checking is "NO", the routine returns back to Step S302 and, if "YES", the HD/SD conversion is terminated. If no description about a size of a picture in Step S302 exists, a process in Step S303 is not performed and the routine proceeds to Step S304.

FOURTH EXAMPLE OF HD/SD CONVERSION

A method for converting a size of a line in a picture (table) in HDTV data contents into a size of the line applicable to an SDTV monitor is described.

Figure 11:
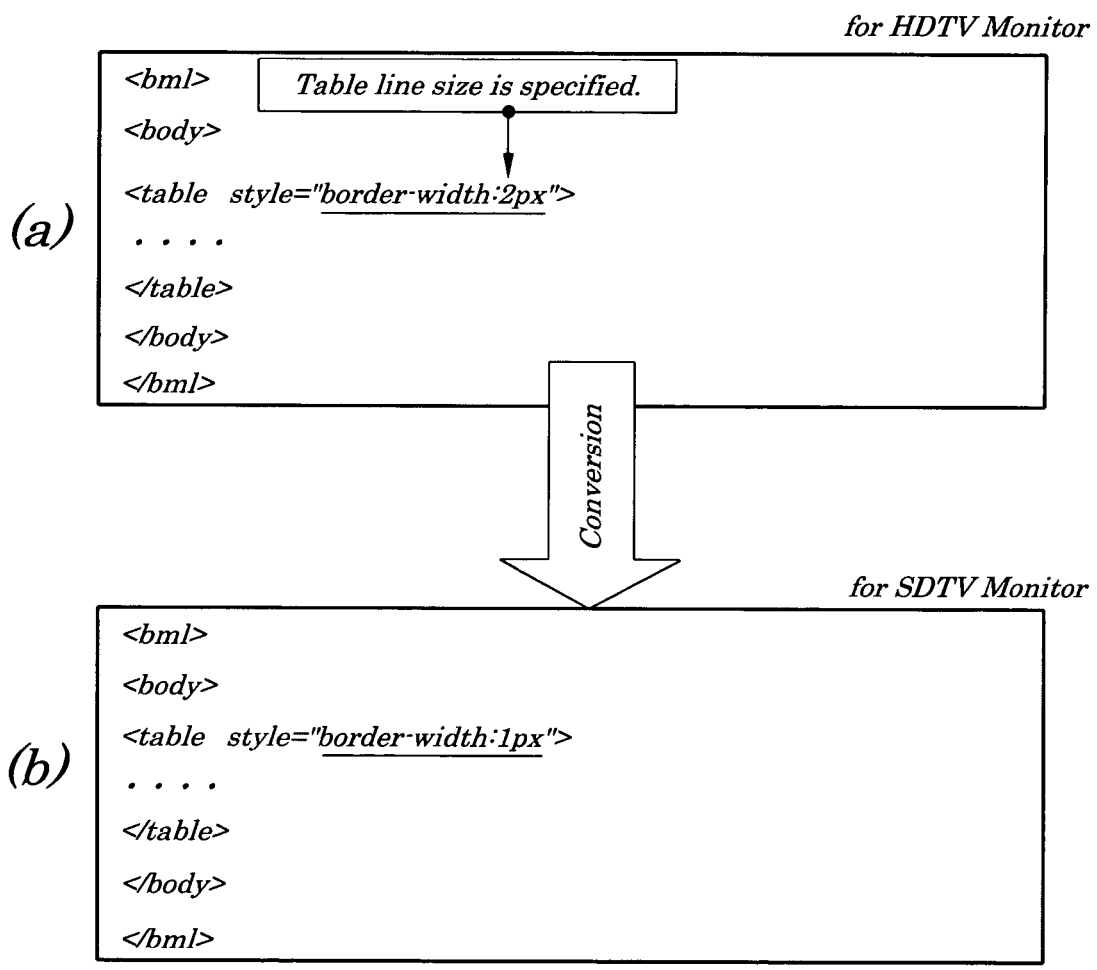
FIG. 11 is a diagram schematically illustrating a fourth example of the HD/SD conversion to be made in the data broadcasting system shown in FIG. 1; the FIG. 11(a) is one example of a BML document for HDTV data contents.
Figure 12:
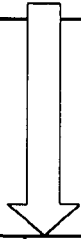
FIG. 12 is a diagram schematically illustrating a display screen of HDTV data contents; the FIG. 12(a) is a diagram schematically illustrating a display screen of HDTV data contents shown in FIG. 11(a)

In FIG. 11, the FIG. 11(a) and FIG. 11(b) are diagrams illustrating a fourth example of the HD/SD conversion and FIG. 11(a) is one example of a BML document for HDTV data contents, and FIG. 11(b) is one example of a BML document for SDTV data contents that can be obtained by making the HD/SD conversion of the HDTV data contents shown in FIG. 11(a). In FIG. 12, the FIG. 12(a) is a schematic diagram illustrating a display screen on which HDTV data contents shown in FIG. 11(a) are displayed and FIG. 12(b) is a schematic diagram illustrating a display screen on which SDTV data contents shown in FIG. 11(b) are displayed.

As shown in FIG. 11(a), in the BML document for HDTV data contents, a description [<table style="border-width: 2px">] that specifies a size of a line. In the example described above, as shown in FIG. 12(a), a table having a line width of 2 px is displayed on a display screen of the HDTV monitor.

In the HD/SD converting section 13, a value of a size of a line in a table in the BML document in FIG. 11(a) is converted, by multiplying the value of the size by a specified ratio, into a size applicable to the SDTV monitor. As described in the example of the second HD/SD conversion, the specified ratio here denotes a ratio of a resolution in a width and height of each display screen of the HDTV monitor and of the SDTV monitor. As in the case of the third example of the HD/SD conversion, only a ratio of the resolution of a width or height is used in a fixed manner. In the embodiment, the specified ratio is set at (1/2) and the description is converted into a description as shown in FIG. 11(b). More specifically, in the description that specifies a size of a line in a table, a value of "border-width" is calculated as follows:

$$2 \text{ px} \times (1/2) = 1 \text{ px}$$

In the case of the example described in FIG. 11(b), as shown in FIG. 12(b), a table having a line width of 1 px is displayed on a display screen of the SDTV monitor. Thus, by making a direct HD/SD conversion of a description that specifies a size of a line in a table in a BML document, a problem that a line is not displayed is solved and excellent display on a display screen can be achieved.

Figure 13:
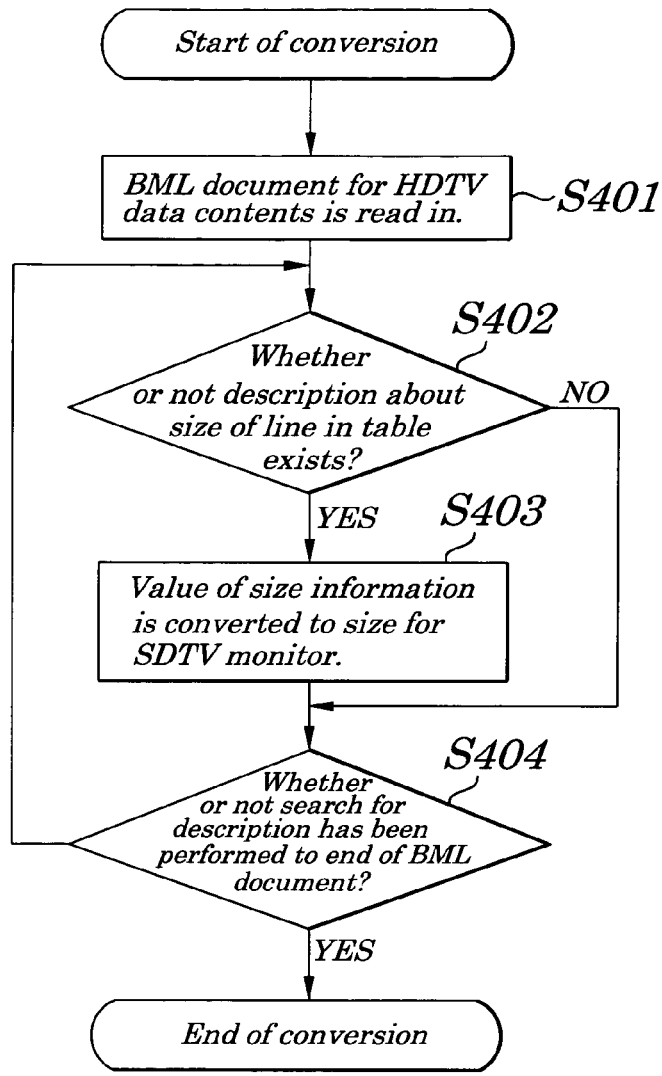
FIG. 13 is a flowchart showing procedures of the fourth example of the HD/SD conversion to be made in the data broadcasting system shown in FIG. 1.

FIG. 13 is a diagram showing an example of procedures for making the HD/SD conversion of a description that specifies a size of a line in a table in the BML document. In the example, in the HD/SD converting section 13, a ratio (1/2) is preset as a ratio at which a size of a line is converted and the HD/SD conversion is made by procedures described below.

First, BML document for HDTV data contents is read in Step S401, and whether or not a description about a size of a line in a table exists in its BML document is checked (Step S402). If a description about a size of a line in a table exists, the description is converted into a description having a size applicable to the SDTV monitor (Step S403). More specifically, a value of the "border-width" is multiplied by a ratio (1/2). After converting, whether or not a search for a description about a width size of a line in a table to be displayed has been performed to the end of the BML document is checked (Step S404). If the result from the checking is "NO", the routine returns back to Step S402 and, if "YES", the HD/SD conversion is terminated. If no description about a size of a picture in Step S402 exists, a process in Step S403 is not performed and the routine proceeds to Step S404.

FIFTH EXAMPLE OF HD/SD CONVERSION

A method for converting a display screen on which HDTV data contents are displayed into a display screen applicable to each SDTV monitor is described which is used when two kinds of SDTV monitors, one having a ratio of a width to a height of a display screen being "4:3" and another having a ratio of the width to the height of the display screen being "16:9", as an SDTV monitor connected to the IRD 2, are selectively connected to the IRD 2.

Figure 14:
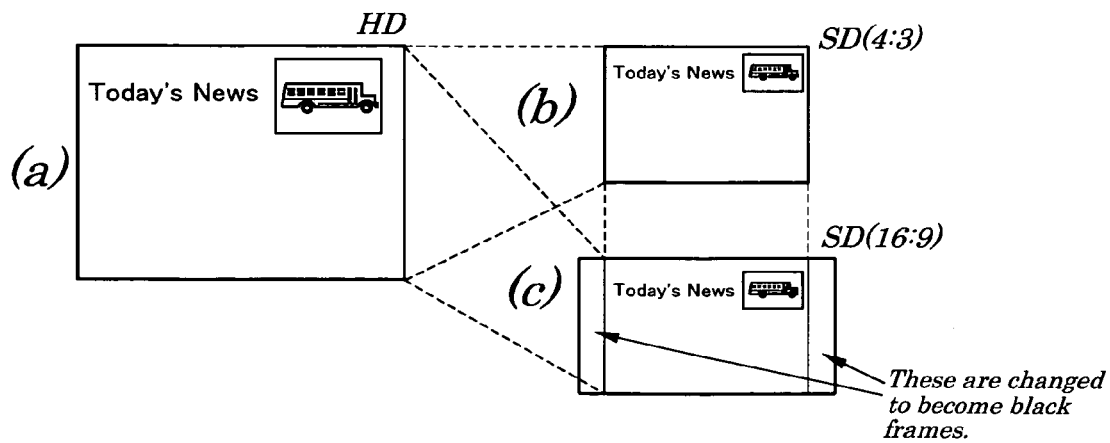
FIG. 14 is a diagram showing a fifth example of the HD/SD conversion to be made in the data broadcasting system shown in FIG. 1; the FIG. 14(a) is a diagram schematically showing an example of an HDTV screen, 14(b) is a diagram schematically showing an example of an SDTV screen having a screen ratio of "4:3", and 14(c) is a diagram schematically showing an example of an SDTV screen having a screen ratio of "16:9"
Figure 15:
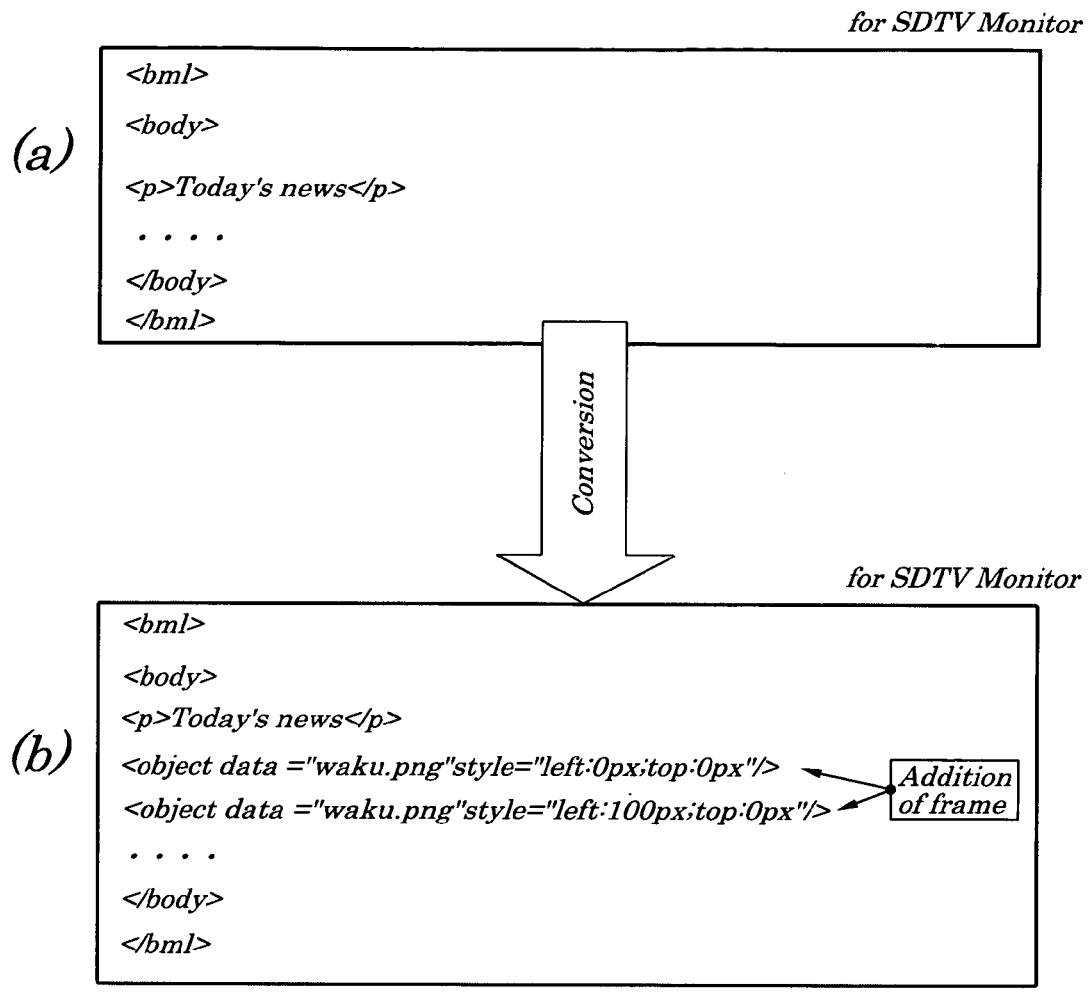
FIG. 15 is a diagram showing one example of a BML document of the TV data contents; the FIG. 15(a) is a diagram showing one example of a BML document of the HDTV data contents.

FIG. 14 is a diagram schematically showing a display screen obtained when HDTV data contents are converted into SDTV data contents applicable to a display screen having a ratio of its width to its height being "4:3". If the SDTV data contents that can be used on a display screen having the ratio of its width to its height being "4:3" are displayed on a display screen for the SDTV data contents applicable to a display screen having the ratio of its width to its height being "16:9", both sides on the display screen become a non-displayed region (black frame). To make this non-displayed region disappear, the HD/SD converting section 13 makes the HD/SD conversion of a BML document of the HDTV data contents into a BML document of the SDTV data contents applicable to a display screen having the ratio of its width to its height being "4:3". Then, the HD/SD converting section 13 makes the HD/SD conversion of a BML document of the SDTV data contents applicable to a display screen having the ratio of its width to its height being "4:3" into a BML document of the SDTV data contents applicable to a display screen having the ratio of its width to its height being "16:9". In this conversion, a description about addition of a frame is added to the BML document. Each of the SDTV data contents being applicable to a display screen having the ratio of its width to its height being "4:3" and being "16:9" is fed to the multiplexing section 15 and is multiplexed to the HDTV video contents 11 and HDTV data contents 12.

The IRD 2 is provided with a switching section used to select a screen ratio out of the ratios of "4:3" and "16:9" and an operator can performs a switching operation according to the screen ratio of the SDTV monitor connected to the SDTV outputting terminal 28.

In the IRD 2, received digital broadcasting data is separated by the multiplexing separation section 20 into HDTV video contents 21, HDTV data contents 22, and SDTV data contents 23. The SDTV data contents 23 contains SDTV data contents applicable to screens having the ratio of its width to its height being "4:3" and being "16:9" and are fed respectively to the video/data synthesizing section 26. If the screen ratio of "4:3" is selected, the video/data synthesizing section 26 synthesizes SDTV data contents applicable to a display screen of the screen ratio of "4:3" and SDTV video contents to be fed from the down-scaling section 24 to produce SDTV display data. When the screen ratio of "16:9" is selected by the switching section, the video/data synthesizing section 26 synthesizes the SDTV data contents having the screen ratio of "16:9" and the SDTV video contents to be fed from the down-scaling section 24 to produce SDTV display data.

Figure 16:
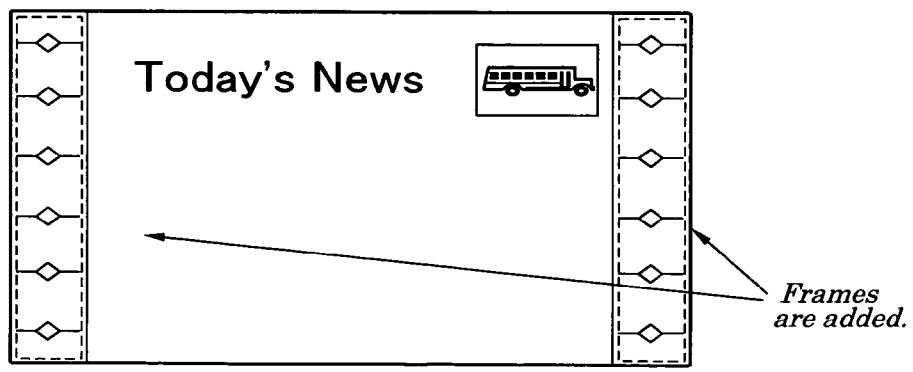
FIG. 16 is a diagram schematically showing one example of a display screen in which a frame is added to a non-displayed region.

According to operations described above, when the SDTV monitor having the screen ratio of "4:3" is connected to the IRD 2, by selecting the screen ratio of "4:3" using the switching section, the SDTV data contents applicable to a display screen of the screen ratio of "4:3" are displayed on the display screen. Moreover, when the SDTV monitor having the screen ratio of "16:9" is connected to the IRD 2, by selecting the screen ratio of "16:9" using the switching section, the SDTV data contents having the screen ratio of "16:9" are displayed on the display screen. In this case, on the display screen, frames are added to the non-displayed region, for example, as shown in FIG. 16.

In the above description, the SDTV data contents having the screen ratio of "16:9" are created from the SDTV data contents having the screen ratio of "4:3"; however, the SDTV data contents having the screen ratio of "16:9" may be created directly from the HDTV data contents. Moreover, it is possible that SDTV data contents having the screen ratio of "16:9" are created from HDTV data contents and SDTV data contents having the screen ratio of "4:3" are created from the created SDTV data contents having the screen ratio of "16:9". Furthermore, when a display position of a frame is deviated on the SDTV screen, it is possible to add position data for correction corresponding to such deviation to a BML document of SDTV data contents having the screen ratio of "16:9".

SIXTH EXAMPLE OF HD/SD CONVERSION

A method is described for converting a display screen on which HDTV data contents are displayed into a display screen being suitable to a display characteristic of each SDTV monitor to be employed when the IRD 2 is selectively connected to any one of a plurality of types of SDTV monitors each having a different display characteristic (for example, a gamma characteristic), for example, any one of three types of SDTV monitors including a CRT (Cathode Ray Tube), LCD (Liquid Crystal Display), and PDP (plasma display panel).

The HD/SD converting section 13 is provided, in advance, with conversion data (coefficient) on a display characteristic of each SDTV monitor including a CRT, LCD, and PDP and makes conversion of data of an image of SDTV data contents obtained by making the HD/SD conversion of the HDTV data contents according to the conversion data. This conversion processing produces three SDTV data contents, one for the CRT, another for the LCD, and another for the PDP. Each of these contents is fed to the multiplexing section 15 and is multiplexed with HDTV video contents 11 and HDTV data contents 12.

The IRD 2 has a switching section to select any one of the CRT, LCD, and PDP and an operator can set a type of the SDTV monitor connected to the SDTV outputting terminal 28 by using the switching section.

In the IRD 2, the received digital broadcasting data is separated by the multiplexing separation section 20 into HDTV video contents 21, HDTV data contents 22, and SDTV data contents 23. The SDTV data contents 23 includes three types of the SDTV data contents, one for a CRT, another for an LCD, and another for a PDP, are fed to the video/data synthesizing section 26. When the CRT is selected by the switching section, the video/data synthesizing section 26 synthesizes the SDTV data contents for the CRT and the SDTV video contents fed from the down-scaling section 24 and produces SDTV display data. When the LCD is selected by the switching section, the video/data synthesizing section 26 synthesizes the SDTV data contents for the LCD and the SDTV video contents fed from the down-scaling section 24 and produces SDTV display data. When a PDP is selected by the switching section, the video/data synthesizing section 26 synthesizes SDTV data contents for the PDP and the SDTV video contents fed from the down-scaling section 24 to produce SDTV display data.

According to the above operation, when the SDTV monitor of the CRT is connected to the IRD 2, by selecting the CRT using the switching section, the SDTV data contents for the CRT is displayed on a display screen of the CRT. When the SDTV monitor of the LCD is connected to the IRD 2, by selecting the LCD using the switching section, the SDTV data contents for the LCD is displayed on the display screen of the LCD. When the SDTV monitor of the PDP is connected to the IRD 2, by selecting the PDP using the switching section, the SDTV data contents for the PDP is displayed on the display screen of the PDP. Thus, the SDTV data contents are displayed according to a display characteristic of the connected monitor.

In the data broadcasting system described above, the transmitting system 1 transmits SDTV data contents in addition to HDTV vide contents and HDTV data contents. Here, a relation between a bit rate of a video and a bit rate of data is considered. A bit rate of data is much smaller than a bit rate of a video. Therefore, a problem that a broadcasting band is suppressed by transmission of the SDTV data contents does not occur.

Second Embodiment

Figure 17:
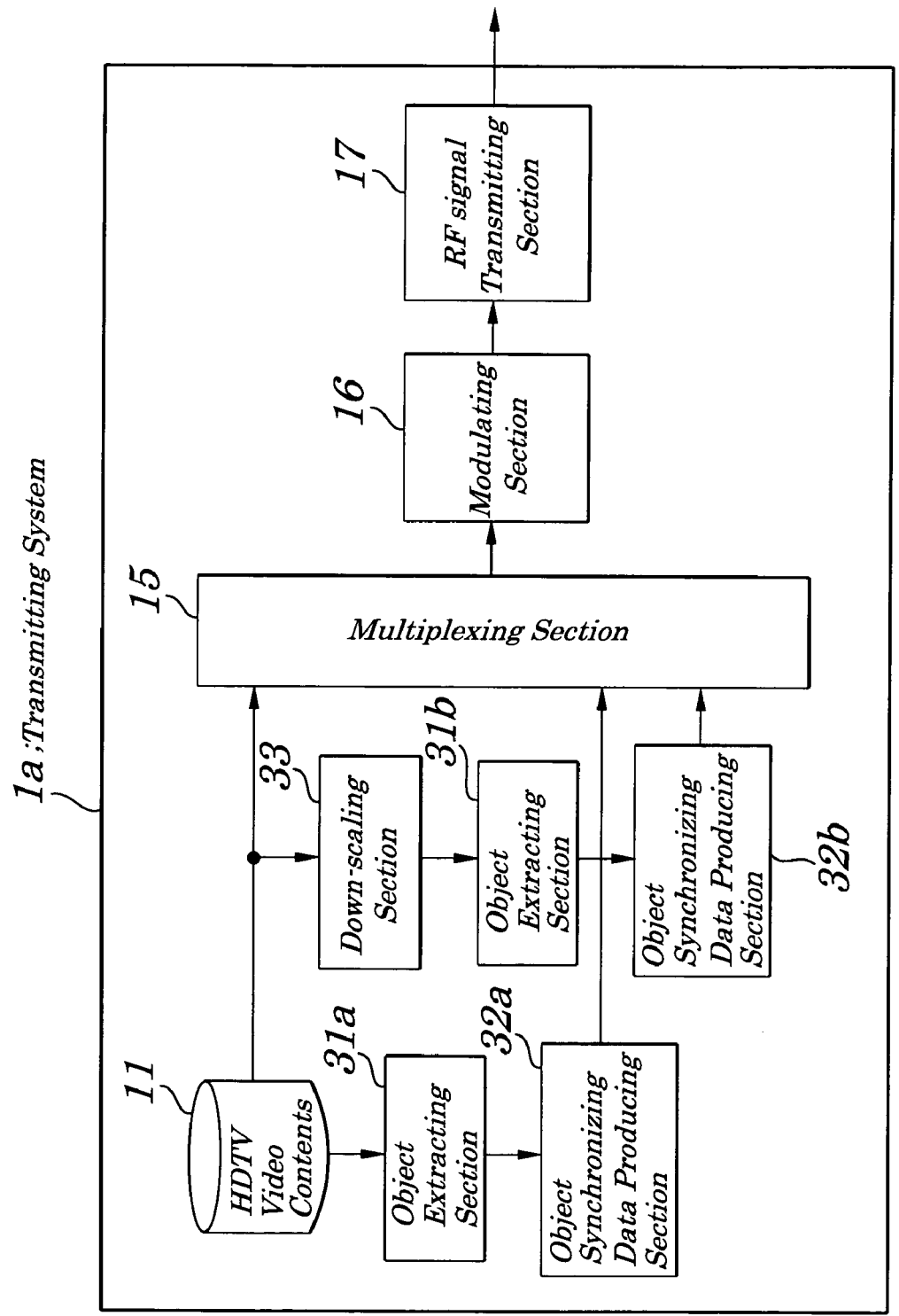
FIG. 17 is a block diagram for schematically showing configurations of the data broadcasting system of a second embodiment.

FIG. 17 is a block diagram for schematically showing configurations of a data broadcasting system of a second embodiment of the present invention. The data broadcasting system of the second embodiment is made up of a transmitting section 1*a,* and an IRD 2 shown in FIG. 1. The data broadcasting system of the second embodiment has the same configurations as the data broadcasting system of the first embodiment except configurations in the transmitting system 1*a*. To avoid duplications of descriptions, only differences from the first embodiment configurations, making up features of the second embodiment will be explained below.

The transmitting system 1*a* includes object extracting sections 31*a* and 31*b,* object synchronizing data producing sections 32*a* and 32*b,* a down-scaling section 33, a multiplexing section 15, a modulating section 16 and an RF signal transmitting section 17. Besides these, though not shown in FIG. 17, the transmitting system 1*a* has a detailed information storing section (not shown) in which detailed information about an object contained in the HDTV video contents is stored in advance.

The object extracting section 31*a* extracts an object from HDTV video contents 11 read, as appropriate, from a storage device (not shown) and feeds information about a position of the extracted object (information about position on a display screen) to the object synchronizing producing section 32*a*. The object synchronizing data producing section 32*a* obtains detailed information about an object extracted from the detailed information storing section by the object extracting section 31*a* and produces HDTV object synchronizing data obtained by associating the obtained detailed information with information about a position of an object fed from the object extracting section 31*a*. The HDTV object synchronizing data is fed to the multiplexing section 15.

The down-scaling section 33 is used to down-scale a resolution of HDTV video contents 11 so as to have a resolution applicable to an SDTV monitor, and its output being the SDTV video contents is fed to the object extracting section 31*b*. The object extracting section 31*b* extracts an object from SDTV video contents fed from the down-scaling section 33 and feeds the information about a position of the extracted object to the object synchronizing data producing section 32*b*. The object synchronizing data producing section 32*b* obtains detailed information about an object extracted from the detailed information storing section by the object extracting section 31*b* and produces SDTV object synchronizing data obtained by associating the obtained detailed information and information about a position of an object fed from the object extracting section 31*b*. The SDTV object synchronizing data is fed to the multiplexing section 15.

The multiplexing section 15 multiplexes HDTV video contents 11, HDTV object synchronizing data fed from the object synchronizing data producing section 32*a* and SDTV object synchronizing data fed from the object synchronizing data producing section 32*b*. The multiplexed data, after having been modulated by the modulating section 16 is transmitted from the RF signal transmitting section 17.

The IRD 2 used in the second embodiment has the same configurations as shown in FIG. 1 and, in a multiplexing separation section 20, data broadcasting contents received from the transmitting system 1*a* are separated into HDTV object synchronizing data and SDTV object synchronizing data.

When the HDTV outputting terminal 27 is connected to an HDTV monitor, a video/data synthesizing section 25 synthesizes HDTV video contents separated by the multiplexing separation section 20 and HDTV object synchronizing data to produce HDTV display data. The produced HDTV display data is fed to the HDTV monitor connected to an HDTV outputting terminal 27. In this case, a position of an object on an HDTV display screen is correctly linked to detailed information.

On the other hand, when an SDTV outputting terminal 28 is connected to the SDTV monitor, a down-scaling section 24 is used to down-scale a resolution of the HDTV video contents separated by the multiplexing section 20 into a resolution applicable to the SDTV monitor and to produce SDTV video contents. Then, a video/data synthesizing section 26 synthesizes the SDTV object synthesizing data separated by the multiplexing separation section 20 and the SDTV video contents produced by the down-scaling section 24 to produce SDTV display data. The produced SDTV display data is fed to the SDTV monitor connected to the SDTV outputting terminal 28. In this case, a position of the object on an SDTV display screen is correctly linked to detailed information.

Third Embodiment

Figure 18:
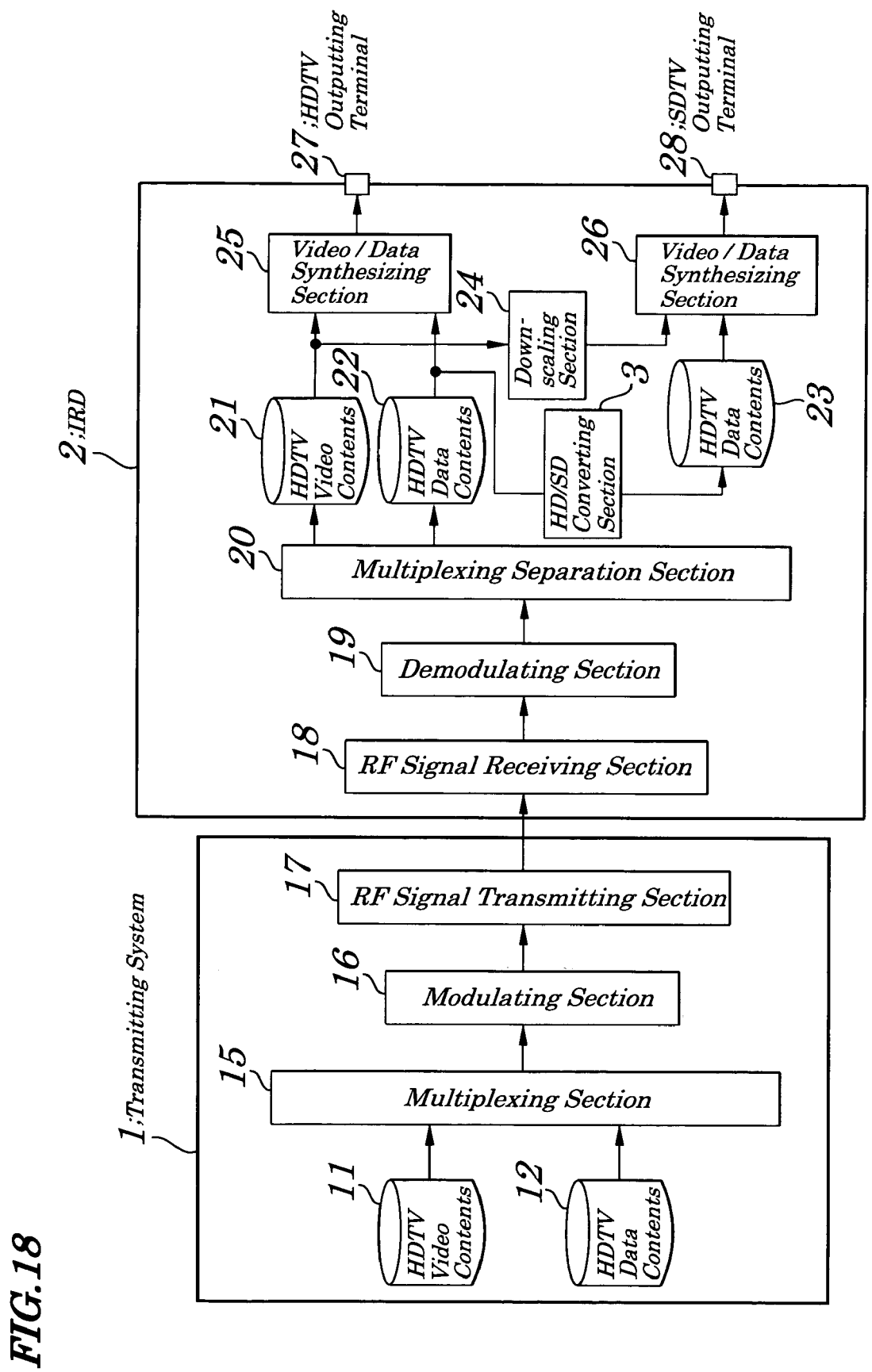
FIG. 18 is a block diagram for schematically showing configurations of the data broadcasting system of a third embodiment.

FIG. 18 is a block diagram for schematically showing configurations of a data broadcasting system of a third embodiment. In the data broadcasting system, an HD/SD converting section 13 is mounted on a side of the IRD 2. That is, an IRD 2 is so configured that HDTV data contents 22 separated by a multiplexing separation section 20 are fed to each of video/data synthesizing section 25 and the HD/SD converting section 3 and that SDTV data contents 23 obtained by HD/SD conversion made by the HD/SD converting section 3 are fed to a video/data synthesizing section 26 together with SDTV video contents fed from a down-scaling section 24. Other configurations except this is the same as shown in FIG. 1. To avoid duplications of descriptions, only configurations making up features of the third embodiment are explained below.

A multiplexing section 15 in a transmitting system 1 multiplexes HDTV video contents 11 and HDTV data contents 12. The multiplexed contents, after having been modulated by a modulating section 16, are transmitted by the RF signal transmitting section 17.

In the IRD 2, data broadcasting contents fed from the transmitting section 1 are received by an RF signal receiving section 18. The received contents are demodulated by a demodulating section 19 and are separated by the multiplexing separation section 20 into HDTV video contents 21 and the HDTV data contents 22.

When an HDTV outputting terminal 27 is connected to an HDTV monitor, the video/data synthesizing section 25 synthesizes the HDTV video contents 21 and HDTV data contents 22 separated by the multiplexing separation section 20 to produce HDTV display data. The produced HDTV display data is fed to the HDTV monitor connected to the HDTV outputting terminal 27. On the HDTV monitor, HDTV display data fed through the HDTV outputting terminal 27 is displayed.

On the other hand, when a SDTV monitor is connected to an SDTV outputting terminal 28, the down-scaling section 24 is used to down-scale a resolution of the HDTV video contents 21 separated by the multiplexing separation section 20 into a resolution applicable to the SDTV monitor to obtain SDTV video contents and the HD/SD converting section 3 makes the HD/SD conversion of the HDTV data contents 22 separated by the multiplexing separation section 20 to obtain the SDTV data contents 23. Then, the video/data synthesizing section 26 synthesizes SDTV video contents and SDTV data contents 23 to produce SDTV display data. The produced SDTV display data is fed to the SDTV monitor connected to the SDTV outputting terminal 28. On the SDTV monitor, SDTV display data fed through the SDTV outputting terminal 28 is displayed.

Since the same HD/SD conversion as in the first embodiment is made in the HD/SD converting section 3, the same effects as obtained in the first embodiment can be achieved in the third embodiment.

The data broadcasting system of each of the embodiments described above can be applied to various broadcasting forms including a form in which data broadcasting is carried out by a broadcast wave using ground waves, BS (Broadcasting Satellite), and CS (Communication Satellite) and/or a form in which broadcasting is carried out by a cable television.

It is apparent that the present invention is not limited to the above embodiments but may be changed and modified without departing from the scope and spirit of the invention. For example, when the HD/SD conversion is made, a following smoothing process may be employed.

Figure 19:
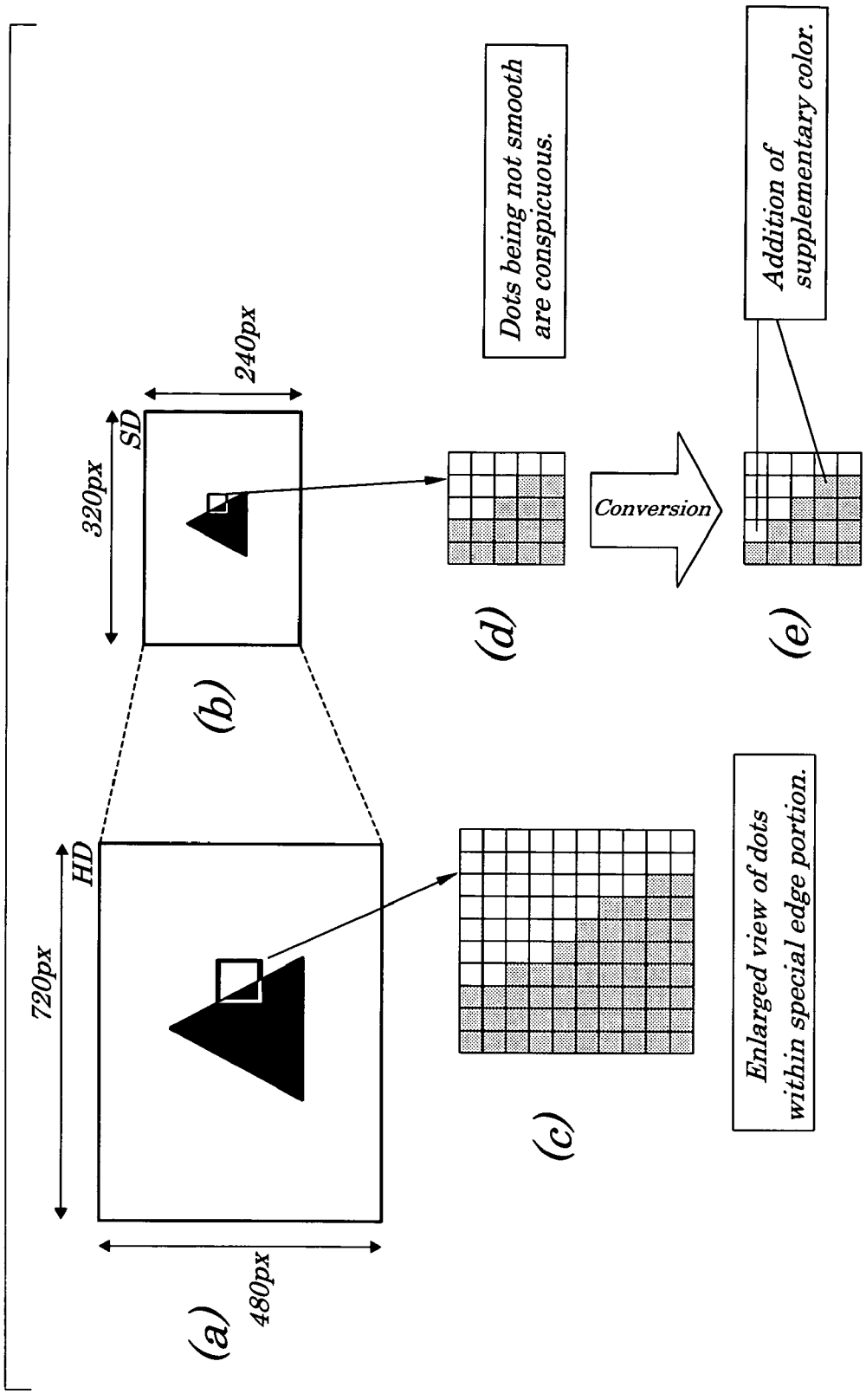
FIG. 19 is a diagram schematically showing smoothing processes (FIG. 19(a) to FIG. 19(e)) to be performed when the HD/SD conversion is made.
Figure 20:
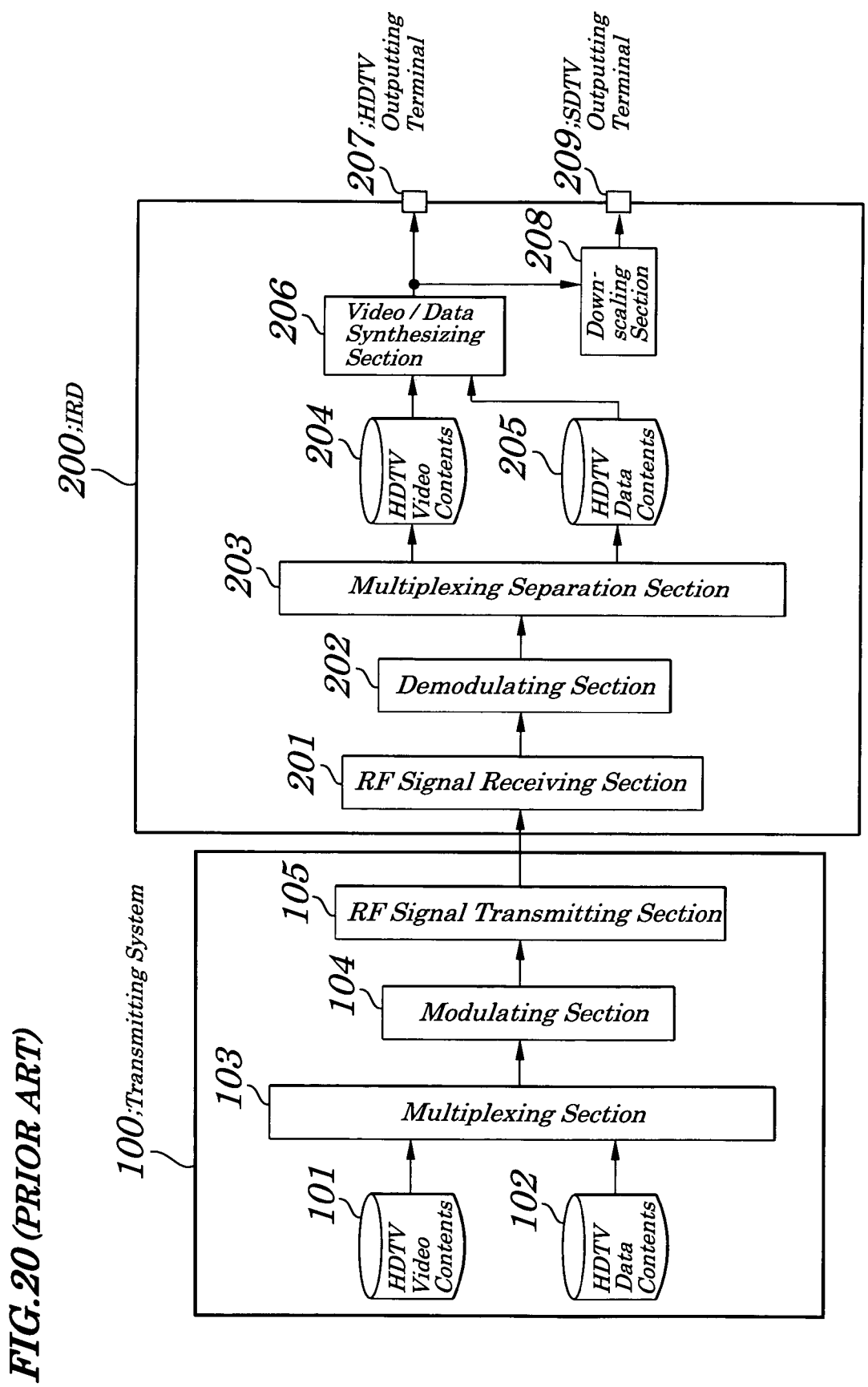
FIG. 20 is a block diagram schematically showing configurations of a conventional data broadcasting system.
Figure 21:
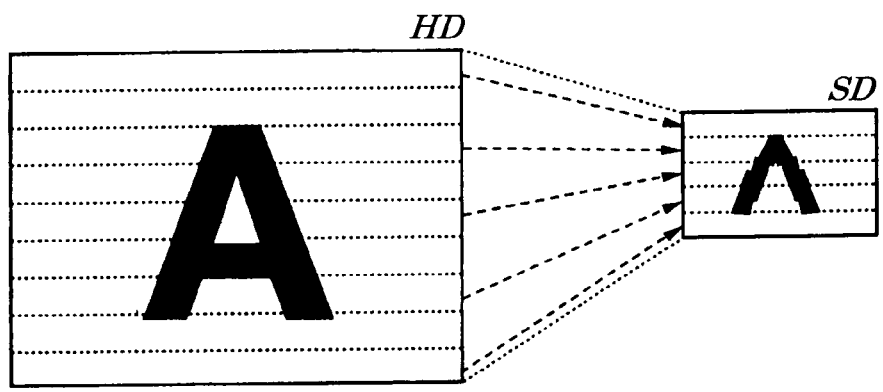
FIG. 21 is a diagram schematically illustrating degradation in image quality of data contents caused by a down-scaled process.
Figure 22:
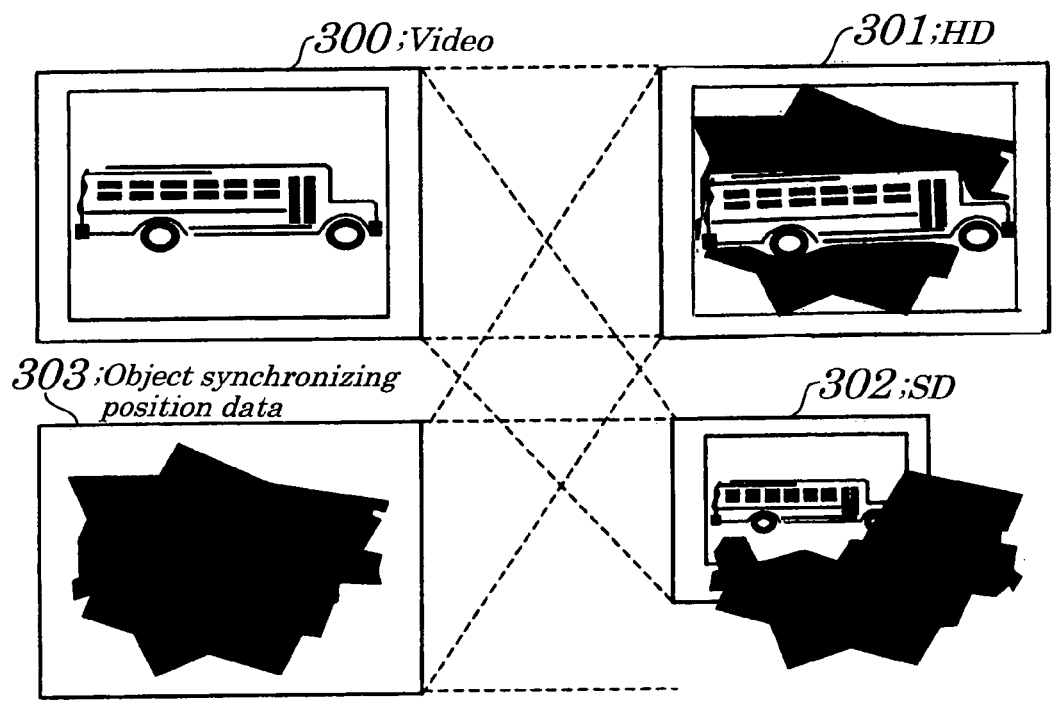
FIG. 22 is a diagram schematically showing a relation among object synchronizing data, HDTV display data, and SDTV display data.

In FIG. 19, the FIG. 19(*a*) to FIG. 19(*e*) are diagrams schematically showing the smoothing process to be performed when the HD/SD conversion is made. FIG. 19(*a*) is an example of a display screen (480 px in height by 720 px in width) of an HDTV monitor and a picture (triangle) is displayed in a center of the display screen. FIG. 19(*b*) is an example of a display screen (240 px in height by 320 px in width) and a picture shown in FIG. 19(*b*) is obtained by making the HD/SD conversion of the picture shown in FIG. 19(*a*). FIG. 19(*c*) is a picture obtained by enlarging a side portion of the picture shown in FIG. 19(*a*). FIG. 19(*d*) is a picture obtained by enlarging a side portion of the picture shown in FIG. 19(*b*).

When the picture shown in FIG. 19(*c*) is compared with the picture shown in FIG. 19(*d*), though alignment of dots (pixels) in a side portion of the picture displayed on the display screen of the HDTV monitor is comparatively smooth, alignment of dots in the side portion of the picture displayed on the display screen of the SDTV monitor is not smooth. As a result, in some cases, a jaggies or a like is seen conspicuously in display of the display screen of the SDTV monitor. To prevent this, as shown in FIG. 19(*e*), the HD/SD converting section 3 performs a process of adding a supplementary color when the HD/SD conversion is made. To the addition of supplementary colors, a smoothing process being widely-used in digital image processing may be used.

What is claimed is:

1. A data broadcasting system comprising:

a transmitting system to transmit data broadcasting contents containing at least video contents and data contents in a Hi-Vision format; and a receiver to which either of a Hi-Vision monitor enabling display in said Hi-Vision format or a standardized monitor having a resolution being different from that of said Hi-Vision monitor is able to be selectively connected;

wherein said transmitting system comprises:

a standardized data producing unit to produce standardized data to be displayed on said standardized monitor corresponding to the data contents in said Hi-Vision format; and a multiplexing unit to multiplex the standardized data contents produced by said standardized data producing unit and the video contents and the data contents in said Hi-Vision format, thereby obtaining the data broadcasting contents;

wherein said receiver comprises:

a multiplexing separation unit to separate the data broadcasting contents having been received from said transmitting system into the video contents and the data contents in said Hi-Vision format and the standardized data contents;

a first video/data synthesizing unit to synthesize the video contents and the data contents in said Hi-Vision format separated by said multiplexing separation unit, thereby obtaining display data contents to be displayed on said Hi-Vision monitor;

a first down-scaling unit to convert the video contents in said Hi-Vision format separated by said multiplexing separation unit into a video contents having a resolution being applicable to said standardized monitor, thereby obtaining standardized video contents; and a second video/data synthesizing unit to synthesize the standardized data contents separated by said multiplexing separation unit and said standardized video contents obtained by said first down-scaling unit, thereby obtaining display data contents to be displayed on said standardized monitor.

2. The data broadcasting system according to claim 1, wherein said standardized data producing unit comprises a converting unit to convert the data contents in said Hi-Vision format into data contents having a resolution being applicable to said standardized monitor, thereby obtaining the standardized data contents.

3. The data broadcasting system according to claim 1, wherein said transmitting system comprises:

a first object extracting unit to extract a first object from the video contents in said Hi-Vision format, thereby obtaining information about a position of the first object; and a first object synchronizing data producing unit to produce a Hi-Vision object synchronizing data obtained by associating said information about the position of the first object acquired by said first object extracting unit with detailed information about the first object being provided in advance and to feed the produced Hi-Vision object synchronizing data as the data contents in said Hi-Vision format to said multiplexing unit;

wherein said standardized data producing unit comprises:

a second down-scaling unit to convert the video contents in said Hi-Vision format into video contents having a resolution being applicable to said standardized monitor, thereby obtaining a standardized video contents;

a second object extracting unit to extract a second object from said standardized video contents obtained by said second down-scaling unit, thereby obtaining information about a position of the second object; and a second object synchronizing data producing unit to produce standardized object synchronizing data obtained by associating information about the position of the second object acquired by said second object extracting unit with detailed information about the second object provided in advance and to feed the produced standardized object synchronizing data as the standardized data contents to said multiplexing unit.

4. The data broadcasting system according to claim 2, wherein said converting unit converts a specified description contained in a Broadcast Markup Language document being data contents in said Hi-Vision format into a description having a resolution being applicable to said standardized monitor.

5. The data broadcasting system according to claim 4, wherein said specified description is a description about a size of a font of a character to be displayed on a monitor screen.

6. The data broadcasting system according to claim 4, wherein said specified description is a description about a type of a font of a character to be displayed on a monitor screen.

7. The data broadcasting system according to claim 4, wherein said specified description is a description about a size of a picture to be displayed on a monitor screen.

8. The data broadcasting system according to claim 4, wherein said specified description is a description about a position in which a character or picture is displayed on a monitor screen.

9. The data broadcasting system according to claim 4, wherein said specified description is a description about a width of a line in a table to be displayed on a monitor screen.

10. The data broadcasting system according to claim 4, wherein a plurality of the standardized monitors each having a different display characteristic is able to be connected to said receiver and wherein said converting unit produces a plurality of pieces of the standardized data contents being suitable to each display characteristic of said plurality of standardized monitors and wherein said second video/data synthesizing unit synthesizes each of said plurality of pieces of standardized data contents produced by said converting unit and said standardized video contents, thereby obtaining display data contents to be displayed on each of said plurality of standardized monitors.

11. The data broadcasting system according to claim 4, wherein first and second standardized monitors each having a different aspect ratio as said standardized monitor are able to be connected to said receiver and wherein said converting unit produces first and second standardized data contents being applicable to said first and second standardized monitors as the standardized data contents and wherein said second video/data synthesizing unit synthesizes each of the first and second standardized data contents and the standardized video contents, thereby obtaining display data contents to be displayed on said first and second standardized monitors.

12. A data broadcasting system comprising:

a transmitting system to transmit data broadcasting contents containing video contents and data contents in a Hi-Vision format; and a receiver to which either of a Hi-Vision monitor enabling display in said Hi-Vision format or a standardized monitor having a resolution being different from that of said Hi-Vision monitor is able to be selectively connected;

wherein said receiver comprises:

a multiplexing separation unit to separate data broadcasting contents having received from said transmitting system into video contents and data contents in said Hi-Vision format;

a first video/data synthesizing unit to synthesize the video contents and the data contents in said Hi-Vision format separated by said multiplexing separation unit, thereby obtaining display data contents to be displayed on said Hi-Vision monitor;

a down-scaling unit to convert the video contents in said Hi-Vision format separated by said multiplexing separation unit into video contents having a resolution being applicable to said standardized monitor, thereby obtaining standardized video contents; and a converting unit to convert data contents in said Hi-Vision format separated by said multiplexing separation unit into data contents having a resolution being applicable to said standardized monitor, thereby obtaining standardized data contents; and a second video/data synthesizing unit to synthesize the standardized data contents obtained by said converting unit and the standardized video contents acquired by said down-scaling unit, thereby obtaining display data contents to be displayed on said standardized monitor.

13. The data broadcasting system according to claim 12, wherein said converting unit converts a specified description contained in a Broadcast Markup Language document being data contents in said Hi-Vision format into a description having a resolution being applicable to said standardized monitor.

14. The data broadcasting system according to claim 13, wherein said specified description is a description about a size of a font of a character to be displayed on a monitor screen.

15. The data broadcasting system according to claim 13, wherein said specified description is a description about a type of a font of a character to be displayed on a monitor screen.

16. The data broadcasting system according to claim 13, wherein said specified description is a description about a size of a picture to be displayed on a monitor screen.

17. The data broadcasting system according to claim 13, wherein said specified description is a description about a position in which a character or picture is displayed on a monitor screen.

18. The data broadcasting system according to claim 13, wherein said specified description is a description about a width of a line in a table to be displayed on a monitor screen.

19. The data broadcasting system according to claim 13, wherein a plurality of the standardized monitors each having a different display characteristic is able to be connected to said receiver and wherein said converting unit produces a plurality of pieces of the standardized data contents being suitable to each display characteristic of said plurality of standardized monitors and wherein said second video/data synthesizing unit synthesizes each of said plurality of pieces of standardized data contents produced by said converting unit and said standardized video contents, thereby obtaining display data contents to be displayed on each of said plurality of standardized monitors.

20. The data broadcasting system according to claim 13, wherein first and second standardized monitors each having a different aspect ratio as said standardized monitor are able to be connected to said receiver and wherein said converting unit produces first and second standardized data contents being applicable to said first and second standardized monitors as the standardized data contents and wherein said second video/data synthesizing unit synthesizes each of the first and second standardized data contents and the standardized video contents, thereby obtaining display data contents to be displayed on said first and second standardized monitors.

21. A data broadcasting contents transmitting system for transmitting data broadcasting contents containing at least video contents and data contents in a Hi-Vision format to a receiver to which a Hi-Vision monitor enabling display of said Hi-Vision format and a standardized monitor having a resolution being different from that of said Hi-Vision monitor is able to be selectively connected comprising:
- a standardized data producing unit to produce standardized data contents to be displayed on said standardized monitor corresponding to data contents in said Hi-Vision format; and
- a multiplexing unit to multiplex the standardized data contents produced by said standardized data producing unit and video contents and data contents in said Hi-Vision format, thereby obtaining the data broadcasting contents.

22. The data broadcasting contents transmitting system according to claim 21, wherein said standardized data producing unit comprises a converting unit to convert data contents in said Hi-Vision format into data contents having a resolution being applicable to said standardized monitor, thereby obtaining the standardized data contents.

23. The data broadcasting contents transmitting system according to claim 22, wherein said converting unit converts a specified description contained in a Broadcast Markup Language document being data contents in said Hi-Vision format into a description having a resolution being applicable to said standardized monitor.

24. The data broadcasting contents transmitting system according to claim 23, wherein said specified description is a description about a size of a font of a character to be displayed on a monitor screen.

25. The data broadcasting contents transmitting system according to claim 23, wherein said specified description is a description about a type of a font of a character to be displayed on a monitor screen.

26. The data broadcasting contents transmitting system according to claim 23, wherein said specified description is a description about a size of a picture to be displayed on a monitor screen.

27. The data broadcasting contents transmitting system according to claim 23, wherein said specified description is a description about a position in which a character or picture is displayed on a monitor screen.

28. The data broadcasting contents transmitting system according to claim 23, wherein said specified description is a description about a width of a line in a table to be displayed on a monitor screen.

29. The data broadcasting contents transmitting system according to claim 23, wherein a plurality of standardized monitors each having a different display characteristic as said standardized monitor is able to be connected to said receiver and wherein said converting unit produces, as the standardized data contents, a plurality of pieces of standardized data contents being suitable to each display characteristic of said plurality of standardized monitors.

30. The data broadcasting contents transmitting system according to claim 23, wherein first and second standardized monitors each having a different aspect ratio as said standardized monitor are able to be connected to said receiver and wherein said converting unit produces first and second standardized data contents being applicable to said first and second standardized monitors as the standardized data contents.

31. The data broadcasting contents transmitting system according to claim 21, further comprising;
- a first object extracting unit to extract a first object from the video contents in said Hi-Vision format, thereby obtaining information about a position of the first object; and
- a first object synchronizing data producing unit to produce Hi-Vision object synchronizing data obtained by associating said information about the position of the first object acquired by said first object extracting unit with detailed information about the first object being provided in advance and to feed the produced Hi-Vision object synchronizing data as the data contents in said Hi-Vision format to said multiplexing unit;

wherein said standardized data producing unit comprises:
- a down-scaling unit to convert the video contents in said Hi-Vision format into video contents having a resolution being applicable to said standardized monitor, thereby obtaining a standardized video contents;
- a second object extracting unit to extract a second object from said standardized video contents obtained by said down-scaling unit, thereby obtaining information about a position of the second object; and
- a second object synchronizing data producing unit to produce standardized object synchronizing data obtained by associating information about the position of the second object acquired by said second object extracting unit with detailed information about the second object provided in advance and to feed the produced standardized object synchronizing data as the standardized data contents to said multiplexing unit.

32. A receiver to which a Hi-Vision monitor enabling display of a Hi-Vision format and a standardized monitor having a resolution being different from that of said Hi-Vision monitor is able to be selectively connected comprising:
- a receiving unit to receive data broadcasting contents obtained by multiplexing video contents and data contents in said Hi-Vision format and standardized data to be displayed on said standardized monitor corresponding to the standardized data contents;
- a multiplexing separation unit to separate data broadcasting contents received by said receiving unit into the video contents and the data contents in said Hi-Vision format and the standardized data contents;
- a first video/data synthesizing unit to synthesize the video contents and the data contents in said Hi-Vision format separated by said multiplexing separation unit, thereby obtaining display data contents to be displayed on said Hi-Vision monitor;
- a down-scaling unit to convert video contents in said Hi-Vision format separated by said multiplexing separation unit into video contents having a resolution being applicable to said standardized monitor, thereby obtaining standardized video contents; and
- a second video/data synthesizing unit to synthesize the standardized data contents separated by said multiplexing separation unit and standardized video contents obtained by said down-scaling unit, thereby obtaining display data contents to be displayed on said standardized monitor.

33. A receiver to which a Hi-Vision monitor enabling display of a Hi-Vision format and a standardized monitor having a resolution being different from that of said Hi-Vision monitor is able to be selectively connected comprising:

a receiving unit to receive data broadcasting contents obtained by multiplexing video contents and data contents in said Hi-Vision format;

a multiplexing separation unit to separate data broadcasting contents having received by said receiving unit into the video contents and the data contents in said Hi-Vision format;

a first video/data synthesizing unit to synthesize the video contents and the data contents in said Hi-Vision format separated by said multiplexing separation unit, thereby obtaining display data contents to be displayed on said Hi-Vision monitor;

a down-scaling unit to convert the video contents in said Hi-Vision format separated by said multiplexing separation unit into video contents having a resolution being applicable to said standardized monitor, thereby obtaining standardized video contents;

a converting unit to convert the data contents in said Hi-Vision format separated by said multiplexing separation unit into data contents having a resolution being applicable to said standardized monitor, thereby obtaining standardized data contents; and a second video/data synthesizing unit to synthesize standardized data contents obtained by said converting unit and the standardized video contents obtained by said down-scaling unit, thereby obtaining display data contents to be displayed on said standardized monitor.

34. The receiver according to claim 33, wherein said converting unit converts a specified description contained in a Broadcast Markup Language document being data contents in said Hi-Vision format into a description having a resolution being applicable to said standardized monitor.

35. The receiver according to claim 34, wherein said specified description is a description about a font size of a character to be displayed on a monitor screen.

36. The receiver according to claim 34, wherein said specified description is a description about a font type of a character to be displayed on a monitor screen.

37. The receiver according to claim 34, wherein said specified description is a description about a size of a picture to be displayed on a monitor screen.

38. The receiver according to claim 34, wherein said specified description is a description about a position in which a character or picture is displayed on a monitor screen.

39. The receiver according to claim 34, wherein said specified description is a description about a width of a line in a table to be displayed on a monitor screen.

40. The receiver according to claim 34, wherein said receiver is able to be connected to a plurality of standardized monitors each having a different display characteristic as said standardized monitor and wherein said converting unit produces, as said standardized monitor, a plurality of pieces of standardized data contents being suitable to each display characteristic of said plurality of standardized monitors and wherein said second video/data synthesizing unit synthesizes each of a plurality of pieces of standardized data contents produced by said converting unit and said standardized video contents, thereby obtaining display data contents to be displayed on said plurality of standardized monitors.

41. The receiver according to claim 34, wherein said receiver is able to be connected to first and second standardized monitors each having a different aspect ratio as said standardized monitor and wherein said converting unit produces first and second standardized data contents being applicable to each of said first and second standardized monitors and said second video/data synthesizing unit synthesizes each of said first and second standardized monitors and said standardized video contents, thereby obtaining display data contents to be displayed on each of said first and second standardized monitors.

42. A format converting method to be employed in a data broadcasting system having a transmitting system to transmit data broadcasting contents containing at least video contents and data contents in a Hi-Vision format and a receiver being able to be selectively connected to either of a Hi-Vision monitor enabling display in said Hi-Vision format or a standardized monitor having a resolution being different from that of said Hi-Vision monitor, said format converting method comprising:

a first step in which said transmitting system transmits said data broadcasting contents obtained by multiplexing the video contents and the data contents in said Hi-Vision format and standardized data contents to be displayed on said standardized monitor corresponding to the data contents; and a second step in which said receiver separates the data broadcasting contents having been received from said transmitting system into the video contents and the data contents in said Hi-Vision format and standardized data contents and converts the separated video contents in said Hi-Vision format into video contents having a resolution being applicable to said standardized monitor, thereby obtaining standardized video contents and synthesizes the obtained standardized video contents and the separated standardized data contents, thereby obtaining display data contents to be displayed on said standardized monitor.

43. The format converting method according to claim 42, wherein said first step contains a step of converting the data contents in said Hi-Vision format into data contents having a resolution being applicable to said standardized monitor, thereby obtaining the standardized data contents.

44. The format converting method according to claim 42, wherein said first step further comprises:

a step of extracting a first object from video contents in said Hi-Vision format to obtain information about a position of the first object and associating the obtained information about the position of the first object with detailed information about the first object provided in advance to produce Hi-Vision object synchronizing data being data contents in said Hi-Vision format;

a step of converting the video contents in said Hi-Vision format into video contents having a resolution being applicable to said standardized monitor, thereby obtaining standardized video contents; and a step of extracting a second object from the obtained standardized video contents to obtain information about a position of the second object and associating the obtained information about the position of the first object with detailed information about the second object provided in advance to produce standardized object synchronizing data being the standardized data contents.

45. A format converting method to be employed in a receiver being able to be selectively connected to either of a Hi-Vision monitor enabling display in a Hi-Vision format or a standardized monitor having a resolution being different from that of said Hi-Vision monitor, said format converting method comprising:

a first step of receiving data broadcasting contents obtained by multiplying video contents and data contents in said Hi-Vision format;

a second step of separating the data broadcasting contents having been received in said first step into video contents and data contents in said Hi-Vision format;

a third step of converting the video contents in said Hi-Vision format separated in said second step into video contents having a resolution being applicable to said standardized monitor, thereby obtaining a standardized video contents;

a fourth step of converting the data contents in said Hi-Vision format separated in said second step into data contents having a resolution being applicable to said standardized monitor, thereby obtaining standardized data contents; and a fifth step of synthesizing the standardized data contents obtained in said fourth step and said standardized video contents obtained in said third step, thereby obtaining display data contents to be displayed on said standardized monitor.

46. A data broadcasting system comprising:

a transmitting system to transmit data broadcasting contents containing at least video contents and data contents in a Hi-Vision format; and a receiving means to which either of a Hi-Vision monitor enabling display in said Hi-Vision format or a standardized monitor having a resolution being different from that of said Hi-Vision monitor is able to be selectively connected;

wherein said transmitting system comprises:

a standardized data producing means to produce standardized data to be displayed on said standardized monitor corresponding to the data contents in said Hi-Vision format; and a multiplexing means to multiplex the standardized data contents produced by said standardized data producing means and the video contents and the data contents in said Hi-Vision format, thereby obtaining the data broadcasting contents;

wherein said receiving means comprises:

a multiplexing separation means to separate the data broadcasting contents having been received from said transmitting system into the video contents and the data contents in said Hi-Vision format and the standardized data contents;

a first video/data synthesizing means to synthesize the video contents and the data contents in said Hi-Vision format separated by said multiplexing separation means, thereby obtaining display data contents to be displayed on said Hi-Vision monitor;

a first down-scaling means to convert the video contents in said Hi-Vision format separated by said multiplexing separation means into a video contents having a resolution being applicable to said standardized monitor, thereby obtaining standardized video contents; and a second video/data synthesizing means to synthesize the standardized data contents separated by said multiplexing separation means and said standardized video contents obtained by said first down-scaling means, thereby obtaining display data contents to be displayed on said standardized monitor.

47. The data broadcasting system according to claim 46, wherein said standardized data producing means comprises a converting means to convert the data contents in said Hi-Vision format into data contents having a resolution being applicable to said standardized monitor, thereby obtaining the standardized data contents.

48. The data broadcasting system according to claim 46, wherein said transmitting system comprises:

a first object extracting means to extract a first object from the video contents in said Hi-Vision format, thereby obtaining information about a position of the first object; and a first object synchronizing data producing means to produce a Hi-Vision object synchronizing data obtained by associating said information about the position of the first object acquired by said first object extracting means with detailed information about the first object being provided in advance and to feed the produced Hi-Vision object synchronizing data as the data contents in said Hi-Vision format to said multiplexing means;

wherein said standardized data producing means comprises:

a second down-scaling means to convert the video contents in said Hi-Vision format into video contents having a resolution being applicable to said standardized monitor, thereby obtaining a standardized video contents;

a second object extracting means to extract a second object from said standardized video contents obtained by said second down-scaling means, thereby obtaining information about a position of the second object; and a second object synchronizing data producing means to produce standardized object synchronizing data obtained by associating information about the position of the second object acquired by said second object extracting means with detailed information about the second object provided in advance and to feed the produced standardized object synchronizing data as the standardized data contents to said multiplexing means.

49. A data broadcasting system comprising:

a transmitting system to transmit data broadcasting contents containing video contents and data contents in a Hi-Vision format; and a receiving means to which either of a Hi-Vision monitor enabling display in said Hi-Vision format or a standardized monitor having a resolution being different from that of said Hi-Vision monitor is able to be selectively connected;

wherein said receiving means comprises:

a multiplexing separation means to separate data broadcasting contents having received from said transmitting system into video contents and data contents in said Hi-Vision format;

a first video/data synthesizing means to synthesize the video contents and the data contents in said Hi-Vision format separated by said multiplexing separation means, thereby obtaining display data contents to be displayed on said Hi-Vision monitor;

a down-scaling means to convert the video contents in said Hi-Vision format separated by said multiplexing separation means into video contents having a resolution being applicable to said standardized monitor, thereby obtaining standardized video contents; and a converting means to convert data contents in said Hi-Vision format separated by said multiplexing separation means into data contents having a resolution being applicable to said standardized monitor, thereby obtaining standardized data contents; and a second video/data synthesizing means to synthesize the standardized data contents obtained by said converting means and the standardized video contents acquired by said down-scaling means, thereby obtaining display data contents to be displayed on said standardized monitor.

* * * * *